United States Patent
Watano et al.

(10) Patent No.: US 12,443,381 B2
(45) Date of Patent: Oct. 14, 2025

(54) VEHICLE INFORMATION DISPLAY SYSTEM, VEHICLE INFORMATION DISPLAY DEVICE, AND VEHICLE CONTROL SYSTEM

(71) Applicant: Koito Manufaturing Co., LTD., Tokyo (JP)

(72) Inventors: Yuichi Watano, Shizuoka (JP); Naohisa Tatara, Shizuoka (JP)

(73) Assignee: Potter Electric Signal Company, LLC, Maryland Heights, MO (US)

( * ) Notice: Subject to any disclaimer, the term of this patent is extended or adjusted under 35 U.S.C. 154(b) by 282 days.

(21) Appl. No.: 17/618,806

(22) PCT Filed: Jun. 24, 2020

(86) PCT No.: PCT/JP2020/024794
§ 371 (c)(1),
(2) Date: Dec. 13, 2021

(87) PCT Pub. No.: WO2020/262453
PCT Pub. Date: Dec. 30, 2020

(65) Prior Publication Data
US 2022/0242430 A1    Aug. 4, 2022

(30) Foreign Application Priority Data

Jun. 28, 2019 (JP) ................ 2019-121131
Jun. 28, 2019 (JP) ................ 2019-121132
Jun. 28, 2019 (JP) ................ 2019-121133

(51) Int. Cl.
| | |
|---|---|
| *G06F 3/14* | (2006.01) |
| *B60Q 1/50* | (2006.01) |
| *B60R 1/23* | (2022.01) |
| *B60W 50/10* | (2012.01) |
| *B60W 60/00* | (2020.01) |
| *G06F 3/01* | (2006.01) |

(Continued)

(52) U.S. Cl.
CPC .......... *G06F 3/1423* (2013.01); *B60Q 1/507* (2022.05); *B60R 1/23* (2022.01); *B60W 50/10* (2013.01);
(Continued)

(58) Field of Classification Search
CPC .... G06F 3/1423; G06F 3/017; B60W 60/001; B60W 50/10; B60W 2540/21;
(Continued)

(56) References Cited

U.S. PATENT DOCUMENTS

| | | |
|---|---|---|
| 2013/0027976 A1 | 1/2013 | Robbins et al. |
| 2014/0211449 A1 | 7/2014 | Nomura et al. |

(Continued)

FOREIGN PATENT DOCUMENTS

JP    2018024291 A    2/2018

OTHER PUBLICATIONS

Office Action in JP2021527689, mailed Aug. 8, 2023, 4 pages.

*Primary Examiner* — Mahmoud S Ismail
(74) *Attorney, Agent, or Firm* — Lewis Rice LLC

(57) ABSTRACT

An information displaying technology for a vehicle that makes it possible to protect the privacy and security of a user who is outside of the vehicle when information is displayed to the user. A vehicle information display system (101) is provided with a plurality of display units (114) comprised of a display (116), drawing lights (117), and a road surface (119), and a control unit (111) for controlling the display units (114), and the control unit (111) includes a display destination selection unit (113) that selects a display unit (114) according to the information to be displayed. Furthermore, a sensor (121) is provided that measures the environment on which information is displayed. The display destination selection unit (113) selects the drawing lights (117) or the display (116) as the display destination.

12 Claims, 22 Drawing Sheets

(51) Int. Cl.
*G10L 15/22* (2006.01)
*G10L 15/25* (2013.01)
*G10L 25/78* (2013.01)
*B60W 30/06* (2006.01)

(52) U.S. Cl.
CPC ........... *B60W 60/001* (2020.02); *G06F 3/017* (2013.01); *G10L 15/22* (2013.01); *G10L 15/25* (2013.01); *G10L 25/78* (2013.01); *B60Q 1/543* (2022.05); *B60Q 1/549* (2022.05); *B60W 30/06* (2013.01); *B60W 2540/21* (2020.02); *B60W 2540/223* (2020.02); *G10L 2015/223* (2013.01)

(58) Field of Classification Search
CPC ... B60W 2540/223; B60W 30/06; B60R 1/23; B60Q 1/507; B60Q 1/549; B60Q 1/543; G10L 15/22; G10L 15/25; G10L 25/78; G10L 2015/223

USPC ........................................................... 701/2
See application file for complete search history.

(56) References Cited

U.S. PATENT DOCUMENTS

| | | |
|---|---|---|
| 2015/0003092 A1 | 1/2015 | Gebauer |
| 2017/0124987 A1* | 5/2017 | Kim ..................... H04N 7/183 |
| 2018/0166047 A1* | 6/2018 | Yamazato ............. G02B 27/01 |
| 2019/0078747 A1 | 3/2019 | Wu et al. |
| 2019/0093847 A1 | 3/2019 | Okada |
| 2019/0162379 A1 | 5/2019 | Stormberg |
| 2019/0166338 A1* | 5/2019 | Greenwood ........... G03B 29/00 |
| 2019/0263263 A1* | 8/2019 | Shimotani ............. B60K 35/00 |
| 2020/0065042 A1* | 2/2020 | Lim ....................... B60K 35/00 |
| 2020/0070716 A1* | 3/2020 | Sakata .................... B60Q 1/50 |
| 2021/0163013 A1* | 6/2021 | Ueno ................ B60W 60/0017 |

* cited by examiner (a)

(b)

VEHICLE INFORMATION DISPLAY SYSTEM, VEHICLE INFORMATION DISPLAY DEVICE, AND VEHICLE CONTROL SYSTEM

CROSS REFERENCE TO RELATED APPLICATION(S)

This application is a § 371 U.S. National Phase of International Application Serial No.: PCT Application No.: PCT/JP2020/024794 filed Jun. 24, 2020, which in turn claims priority to Japanese Patent Application Serial No.: 2019-121131 filed Jun. 28, 2019, Japanese Patent Application Serial No.: 2019-121132 filed Jun. 28, 2019, and Japanese Patent Application Serial No.: 2019-121133 filed Jun. 28, 2019. The entire disclosure of all the above documents is herein incorporated by reference.

TECHNICAL FIELD

The present invention relates to a vehicle information display system, a vehicle information display device, and a vehicle control system that display information to users of an automated vehicle.

The present invention relates to a vehicle information display device that displays information to users of an automated vehicle.

BACKGROUND ART

Conventionally, technologies for vehicle display systems have been known that display information about a vehicle to pedestrians around the vehicle and the drivers of other vehicles. For example, Patent Document 1 describes a technology having a display that is visible from the outside of the vehicle and a distance sensor that measures the distance from the vehicle to an object around the vehicle, whereby the content of the display changes according to the distance.

In recent years, the development of technologies has also been underway to operate an unmanned autonomous vehicle from the outside thereof and move it to a desired location, such as a parking lot or a dispatch location. For example, Patent Document 2 (paragraphs 0114 to 0115 of the specification and FIG. 8 of the drawings, in particular) discloses a technology for receiving an automatic parking instruction signal from a mobile device and executing automatic parking based on the parking location information in the automatic parking instruction signal.

CITATION LIST

Patent Literature

Patent Literature 1: Japanese Published Unexamined Patent Application No. 2017-140929
Patent Document 2: International Publication No. WO 2017-073632

SUMMARY OF INVENTION

Problems to be Solved by the Invention

However, according to the technology of Patent Document 1, for example, when it is desirable to have a user confirm information on the use of a share car, the user's personal information and the information on the use of the share car is shown on the display, potentially allowing others in the vicinity to see the privacy and security-related information.

Therefore, an object of the present invention is to provide a vehicle information display system that is capable of displaying information to a user outside of the vehicle while taking into consideration the privacy and security of the user.

In addition, according to the technology of Patent Document 2, even if there appears to be enough space to pull up the car to the human eye, certain autonomous driving systems set a very large intervehicular distance, making it difficult to save parking space. Another problem is that it takes time and effort to reference the method for setting up and operating the mobile device and also to learn how to use it.

Therefore, an object of the present invention is to provide a vehicle control system for an autonomous vehicle that can easily pull the vehicle up to a desired location from the outside of the vehicle.

Means to Solve the Problems

In order to solve the foregoing problems, a vehicle information display system according to the present invention provides a vehicle information display system for displaying predetermined information to a user, the system characterized by comprising a plurality of display means for displaying the information and a control means for controlling the display means, wherein the control means includes a display destination selection means for selecting the display means according to a content of the information.

The system comprises a sensor for measuring an environment on which information is displayed by the display means, and the display destination selection means is capable of selecting the display destination according to a result of measurement by the sensor.

The display means includes a display and a drawing light for outputting the information and projection objects on which the drawing light projects the information, If the information includes information related to security or privacy, the control means displays an instruction concerning a projection object on the display.

Furthermore, in order to solve the above-described problems, a vehicle information display device according to the present invention provides a vehicle information display device for displaying predetermined information to a user, the device characterized by comprising a drawing light for projecting the information to an outside of a vehicle and a sensor for detecting a user, wherein the drawing light starts projection when the sensor detects at least a part of the body of the user in a projection range of the drawing light.

In order to solve the foregoing problems, a vehicle control system according to the present invention is characterized by comprising a sensor mounted on an autonomous vehicle, a control means for controlling the vehicle based on an input from the sensor, and a vehicle drive mechanism for driving the vehicle based on a control signal that is input from the control means, wherein the sensor detects a gesture of a person in a vicinity of the vehicle, wherein the control means includes a recognition means for recognizing the gesture as an instruction for moving the vehicle, and wherein the vehicle drive mechanism moves the vehicle based on the instruction.

Effects of the Invention

The vehicle information display system of the present invention is provided with a display destination selection means for selecting a display means according to a content of the information displayed. Accordingly, if the information contains information related to the privacy and security of the user, a display means that is not easily visible to a stranger is selected, thus providing an effect of displaying information while taking the privacy and security of the user into consideration.

According to the vehicle information display device of the present invention, the drawing light starts projection when the sensor detects at a least part of the body of a user in a projection range of the drawing light. Accordingly, there is provided an effect of allowing the user to confirm the information displayed on the user's own body and protecting the privacy and security of the user.

Furthermore, according to the vehicle control system of the present invention, a gesture of a person in the vicinity of the autonomous vehicle is detected at the sensor to move the vehicle based on the gesture. An effect is provided of pulling up the vehicle to a desired location based on the user's perception. As an additional effect, as the user can pull up the vehicle using a gesture similar to what has been conventionally made to a driver, there is no need to newly learn how to set up and use a device.

DETAILED DESCRIPTION OF EMBODIMENTS

Embodiments of the present invention as a vehicle information display system, a vehicle information display device, and a vehicle control system installed in share autonomous cars will be described hereinafter based on the drawings.

Embodiment 1

Figure 1:
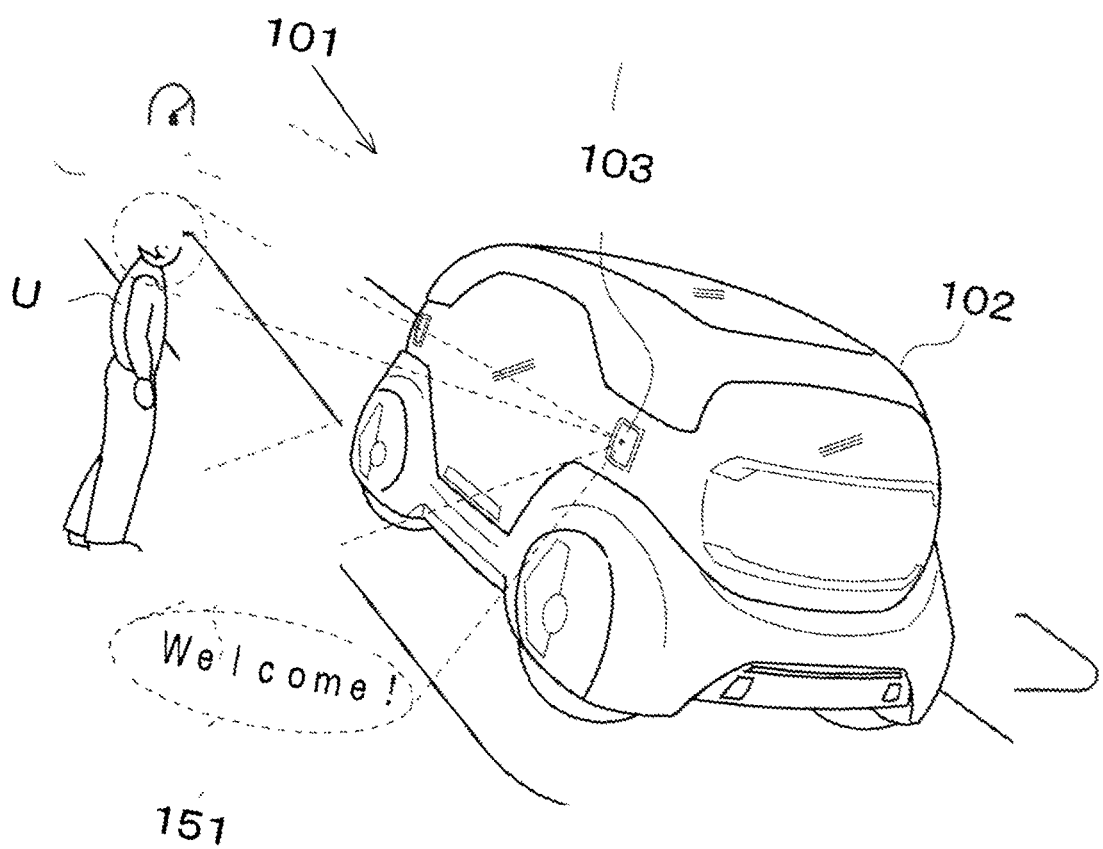
FIG. 1 is a schematic diagram of a vehicle information display system of Embodiment 1.

As shown in FIG. 1, a vehicle information display system 101 of a share car 102, upon recognizing a user U who is to use the share car, draws an image 151 on the road surface that contains hospitality information such as "Welcome!" as well as usage information such as the destination and usage time.

Figure 2:
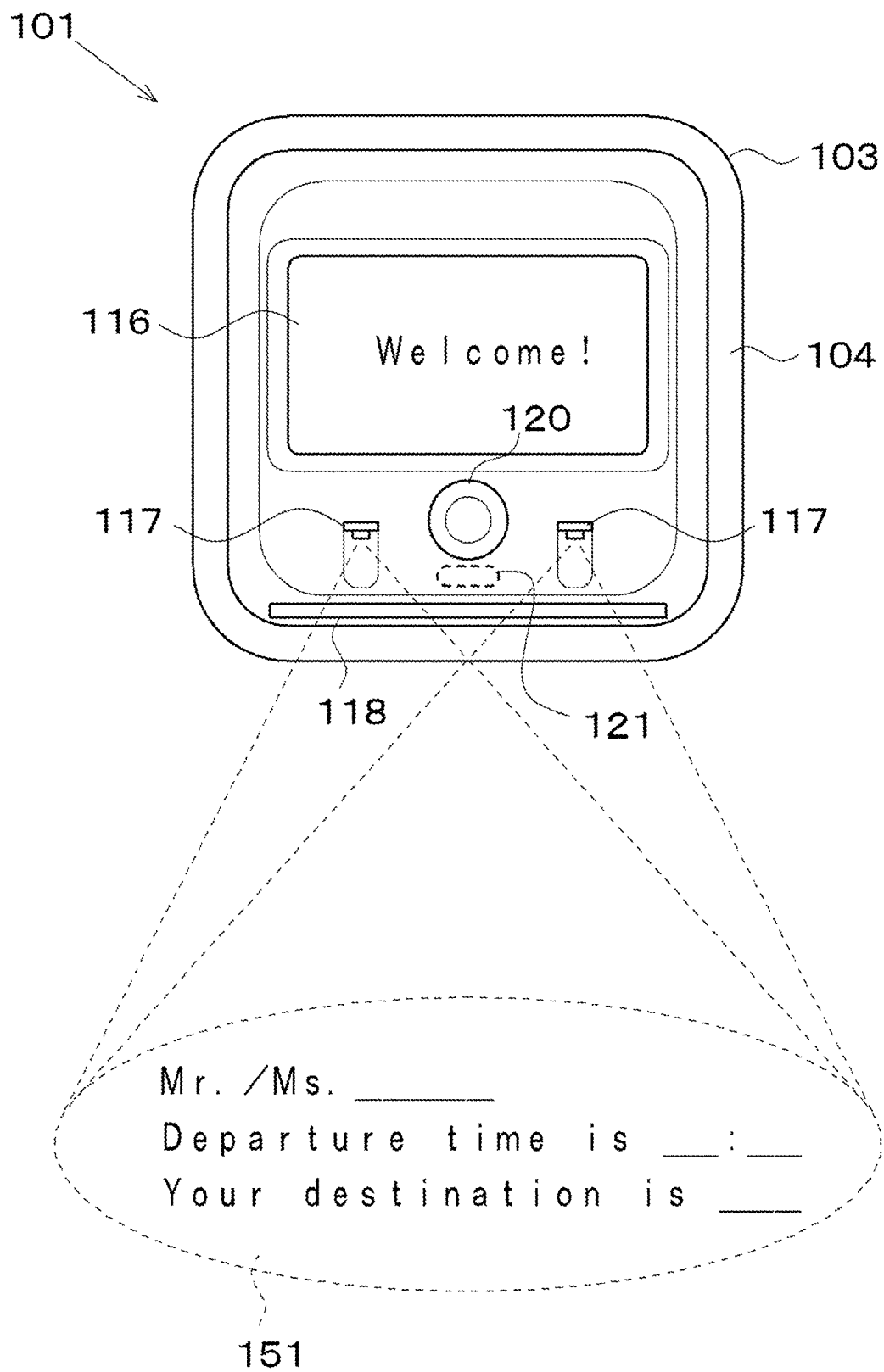
FIG. 2 is a schematic view that shows a side module.

As shown in FIG. 2, the vehicle information display system 101 is mounted on a side module 103 to display information mainly to the outside of the vehicle body. An AD marker (autonomous driving marker) 4 for indicating an autonomous driving state is provided on the periphery of the side module 103.

Figure 3:
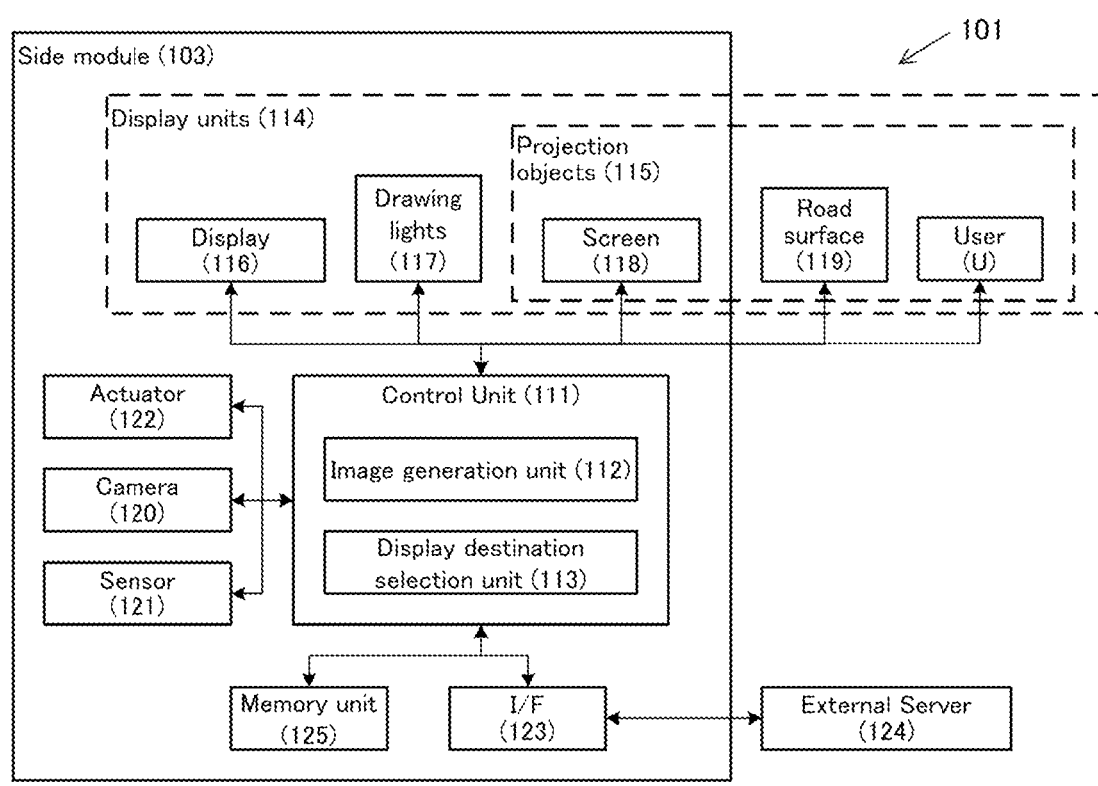
FIG. 3 is a block diagram of the vehicle information display system of FIG. 1.

As shown in FIG. 3, the vehicle information display system 101 includes display units 114 for displaying predetermined information to the user U, a camera 120 for detecting the user U, who is to use the share car 102, a sensor 121 for measuring the environment on which a display unit 114 shows information, a memory unit 125 for storing information to be presented to the user U, an external server 124 for delivering, via cloud communication or wired communication, information to be presented to the user U, a control unit 111 for controlling the display units 114, an actuator 122 for adjusting the position and orientation of display units 114, and an interface 123 for receiving information delivered by the external server 124. It should be noted that a LiDAR, a millimeter wave radar, a voice sensor, etc., can be employed as the sensor 121.

The display units 114 include a display 116, drawing lights 117 that draw images generated by an image generation unit 112, and projection objects 115 on which the drawing lights 117 project the images. The projection objects 115 include a screen 118, a road surface 119, and the body of the user U, such as the palm of a hand and the lap. The screen 118 is normally stored in the side module 103 and is rolled out of the side module 103 during projection (see FIG. 6). The drawing lights 117 can be of a single type capable of drawing a fixed image, or a generative type capable of free drawing using a DMD (Digital Micromirror Device) or other devices.

The control unit 111 includes an image generation unit 112 for generating an image 151 to be displayed with the display units 114 based on information input from the memory unit 125 or the external server 124, and a display destination selection unit 113 for selecting a display unit 114 with which to display the information according to the content of the information.

The display destination selection unit 113 performs face recognition of the user U based on the person photographed by the camera 120 and the usage information about the share car 102 obtained from the external server 124. Subsequently, once the user U is detected, it selects a display destination according to the content of the information to be displayed and the environment on which it is to be displayed.

The display destination selection unit 113 selects either the display 116 or the road surface 119 as the display destination if the content of the information to be displayed does not include information related to security or privacy, such as "Welcome!" for example. In addition, the display destination selection unit 113 determines whether or not the road surface 119 is suitable as a display environment based on the measurement results received from the sensor 121. The road surface 119 may not be suitable as a display environment, for example, if there is a step on the road surface 119 that may distort the drawing, or if the road surface 119 is wet with rain or covered with snow, making it difficult to read the information drawn thereon.

If the display destination selection unit 113 determines that the road surface 119 is suitable as a projection object 115, it selects the drawing lights 117 and the road surface 119 as the display destinations. Then, the image generation unit 112 generates an image 151 for display based on the information to be displayed to the user U, and the control unit 111 outputs the image 151 to the drawing lights 117. Conversely, if it is determined that the road surface 119 is not suitable as a projection object 115, the display 116 is selected as the display destination. In this case, the control unit 111 causes the image 151 to be shown on the display 116.

Figure 4:
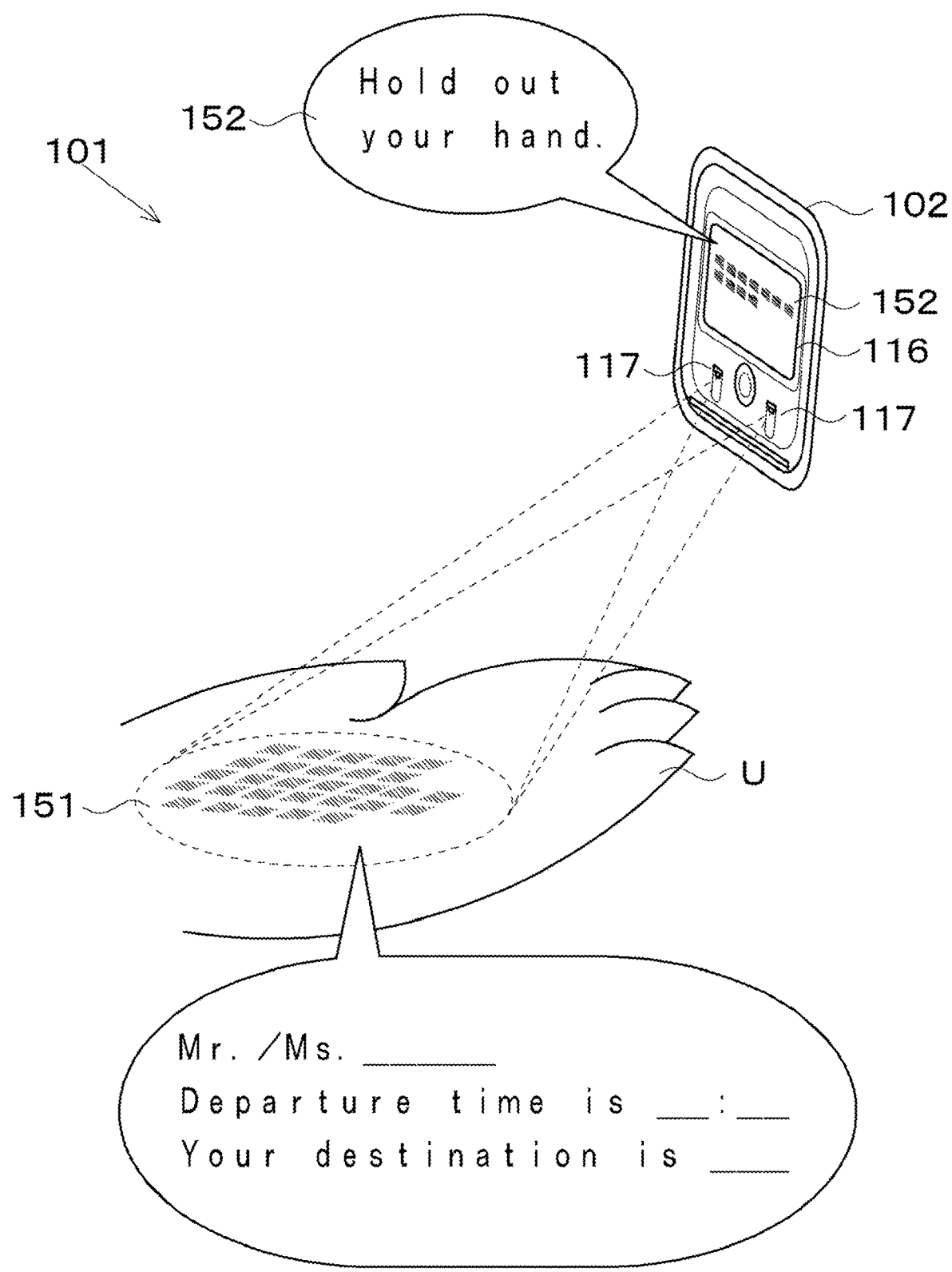
FIG. 4 is an explanatory view that shows how information is projected on the palm of a hand.

If the content of the information to be displayed includes information related to security or privacy, for example, "Mr./Ms. ____" or "Your destination is ____," the display destination selection unit 113 first shows guidance 152 on the display 116. For example, as shown in FIG. 4, it may display "Please hold out your hand". Then, the display destination selection unit 113 detects whether or not the designated projection object 115, i.e., a hand of the user U, is held out in a position where projection is possible, based on the measurement results received from the sensor 121.

Figure 5:
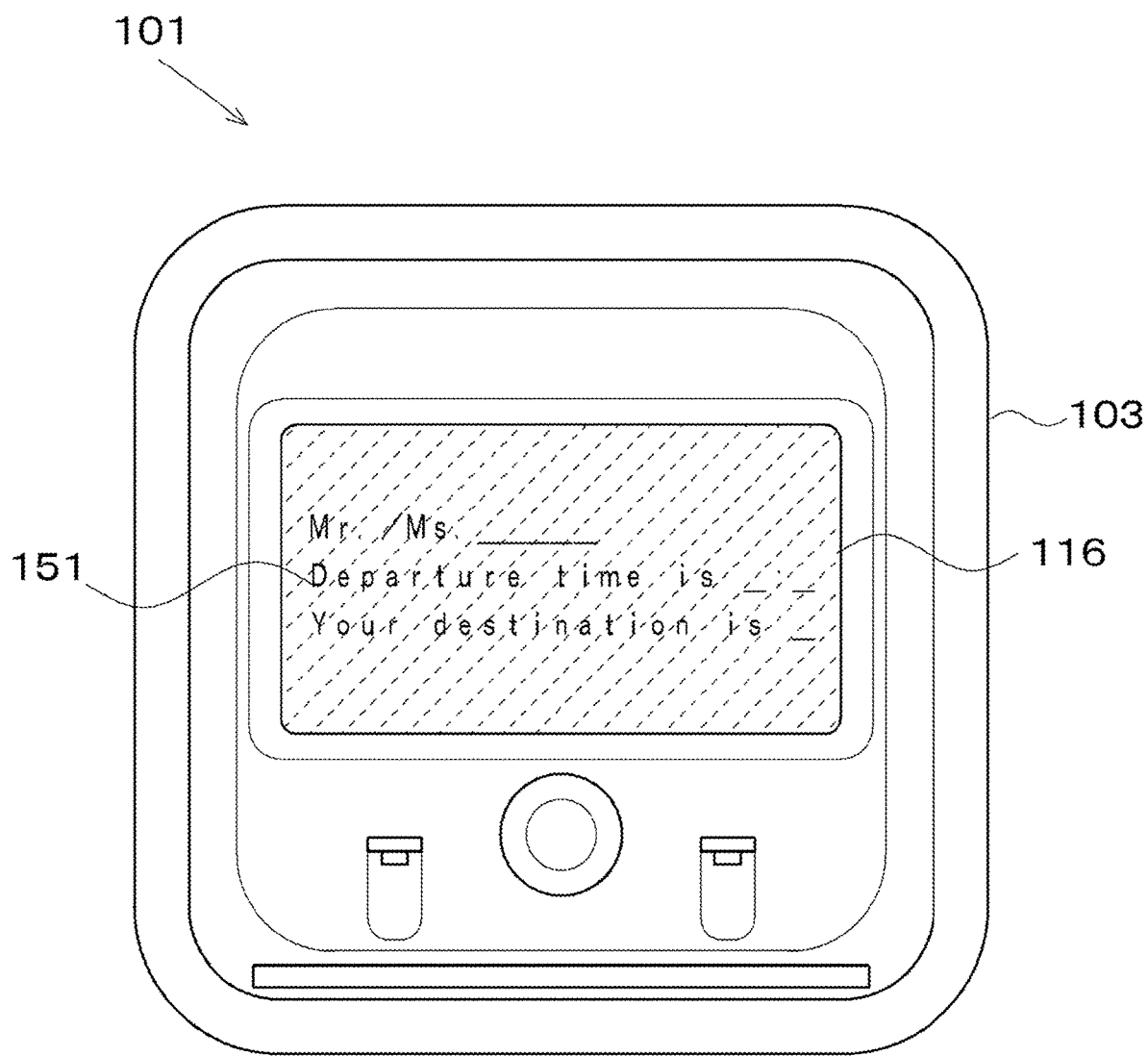
FIG. 5 is an explanatory view that shows how information is projected on a display in a security mode.

If a hand of the user U is detected, the hand of the user U is selected as the display destination, and the control unit 111 outputs an image 151 to be displayed to the drawing lights 117. In this case, the user U can confirm the image 151 by looking at his or her palm. On the other hand, if no hand of the user U can be detected, the display destination selection unit 113 selects the display 116 in security mode as the display destination, as shown in FIG. 5. For example, a display configured to allow the image 151 to be visible only from the front of the display 116 can be employed as the display 116 in security mode.

Figure 6:
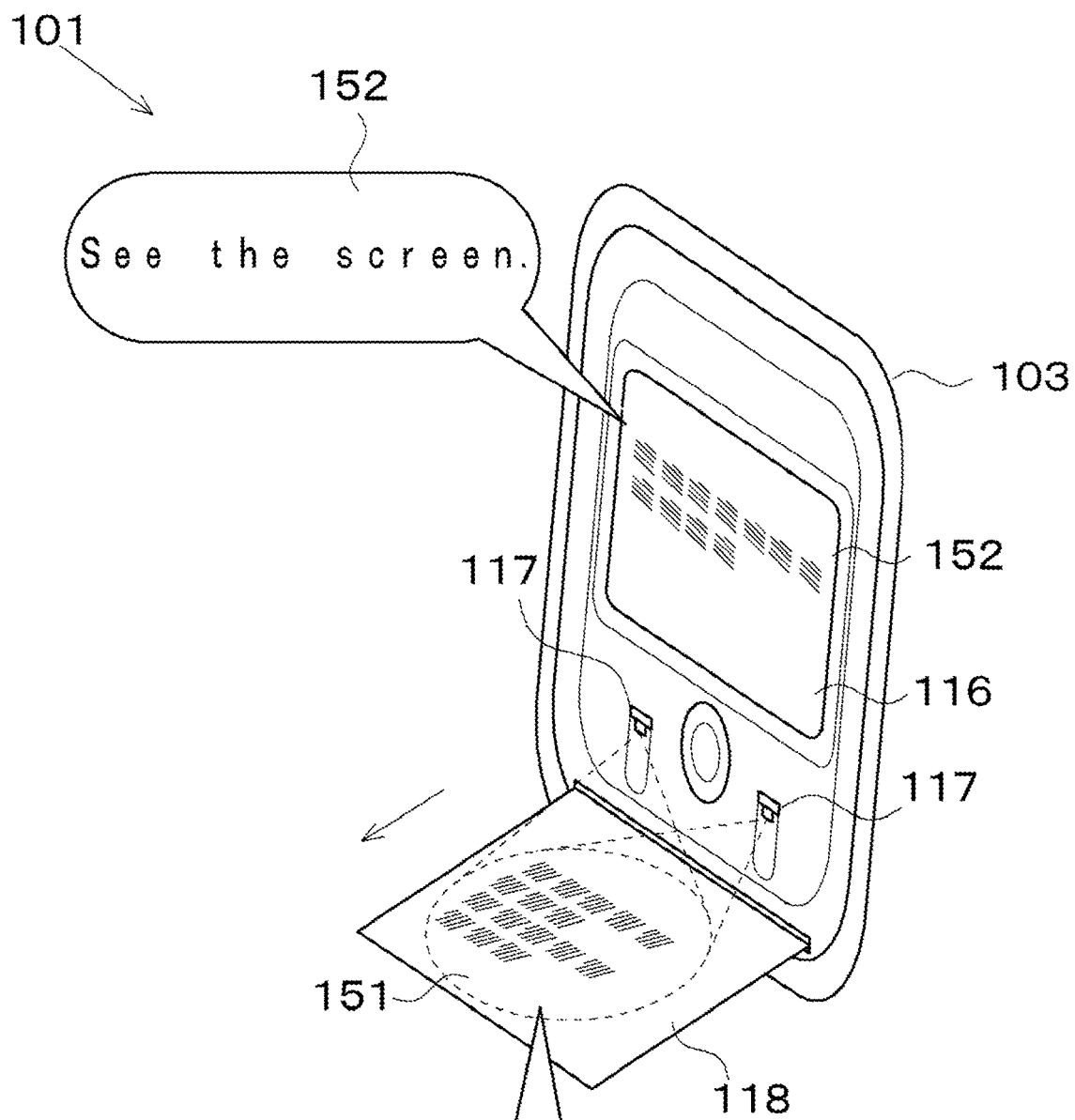
FIG. 6 is an explanatory view that shows how information is projected on a screen.

As shown in FIG. 6, it is also possible to select the screen 118 as the display destination, show "See the screen" on the display 116, and then roll out from the side module 103 the screen 118 on which the image 151 is projected.

Figure 7:
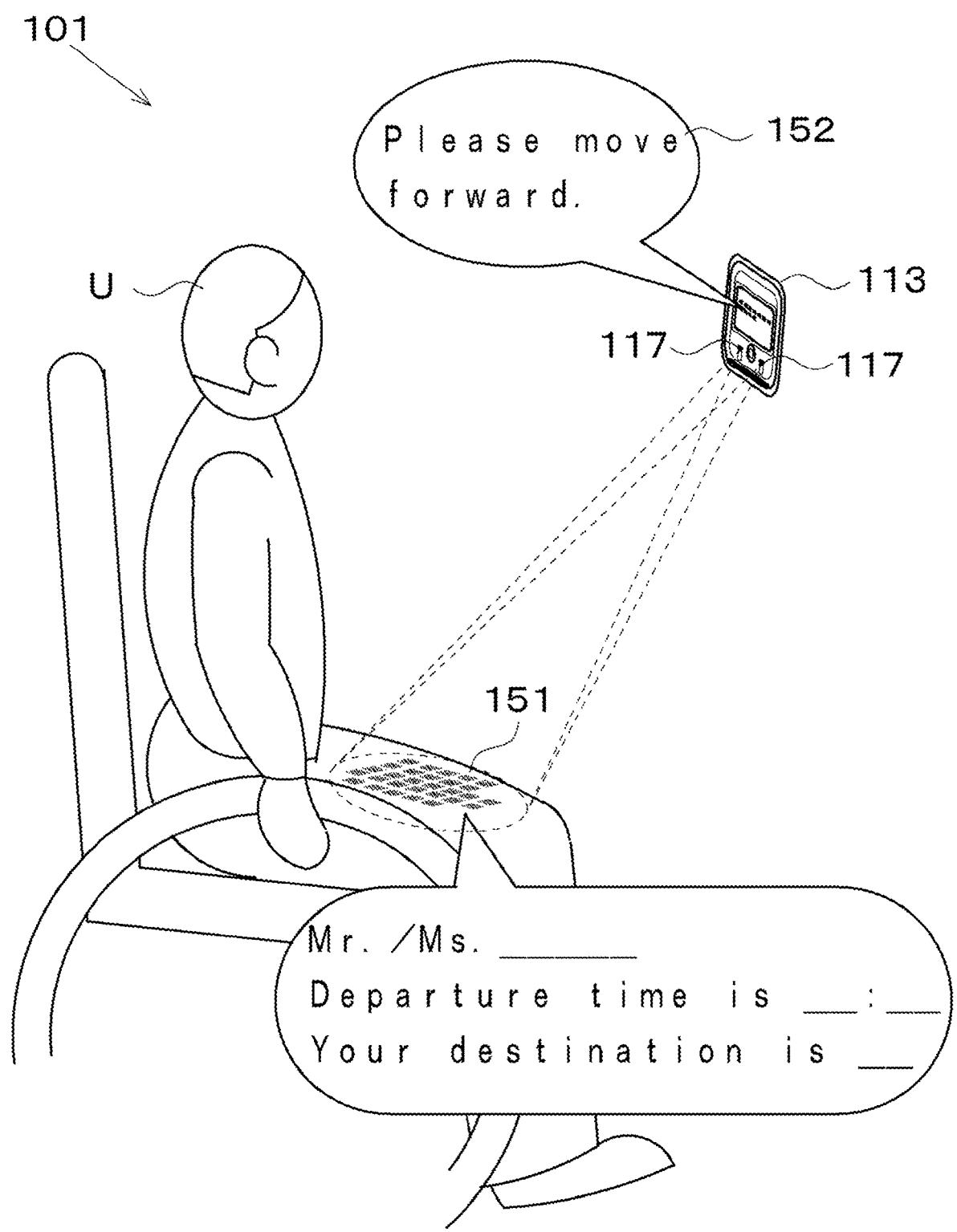
FIG. 7 is an explanatory view that shows how information is projected on a lap.

It should be noted that, for some users U, it may be difficult to hold out their hands or check the screen 118. As shown in FIG. 7, for example, if it is found that the user U is in a wheelchair based on the information obtained from the external server 124, guidance 152, such as "Please move forward" or "Projection will be made on your lap," is shown on the display 116. Then, if the display destination selection unit 113 detects the lap of the user U, the user U's lap is selected as the display destination, and subsequently, the control unit 111 outputs the image 151 to the drawing lights 117. In this way, the guidance 152 can be displayed according to the state of the user U, and a part of the body of the user U can be selected as required for use as a projection object 115.

Figure 8:
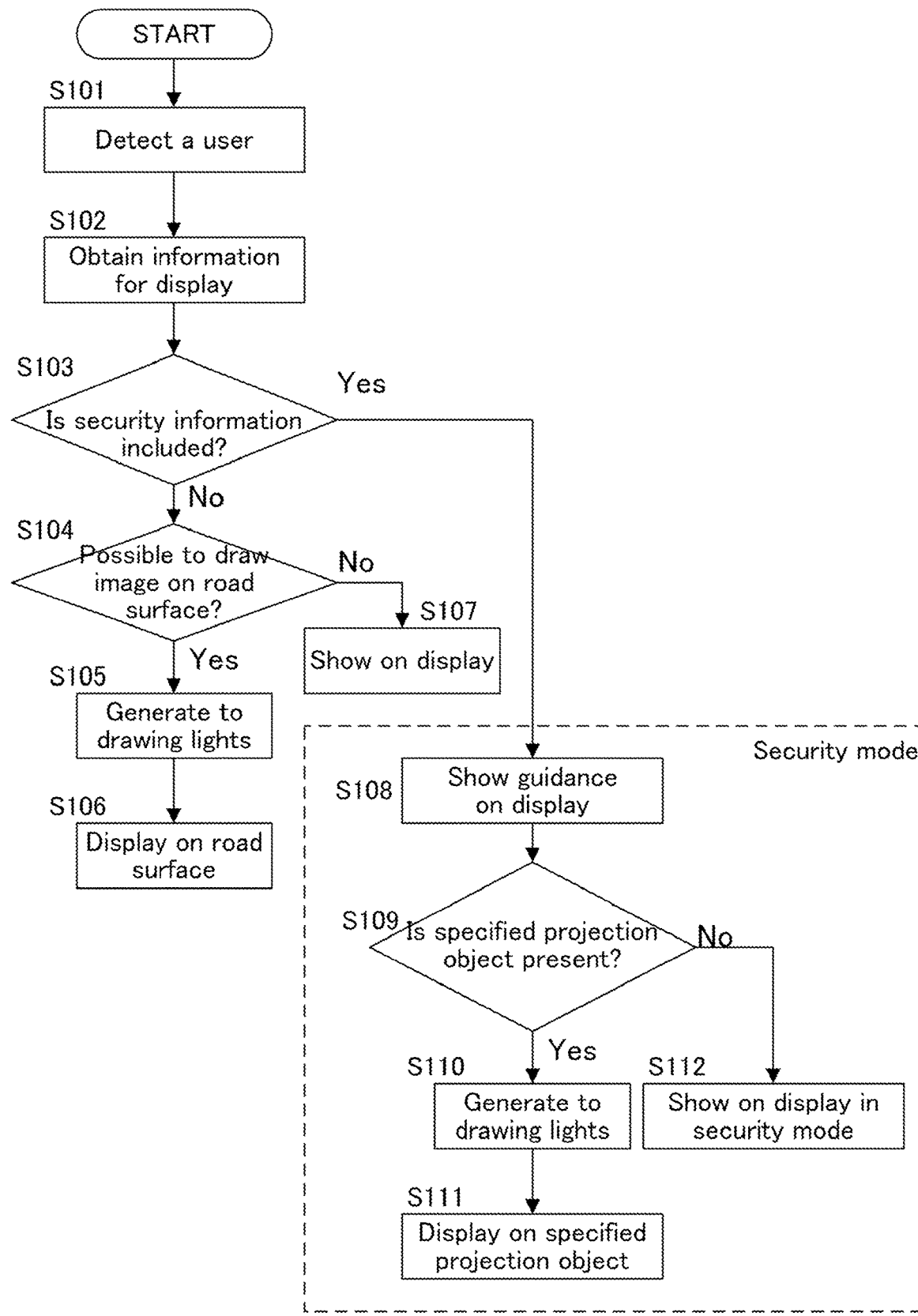
FIG. 8 is a flowchart showing a flowchart that indicates the operation of the vehicle information display system of FIG. 1.

Next, the operation of the vehicle information display system 101 will be described with reference to FIG. 8. First, the display destination selection unit 113 detects the user U based on an image received from the camera 120 (S101) and obtains information to be displayed to the user U (S102). If the obtained information does not include information related to security or privacy (S103: No), it is determined whether or not it is possible to draw an image on the road surface 119 based on the measurement results received from the sensor 121. If it is determined that it is possible (S104: Yes), the display destination selection unit 113 selects the road surface 119 as the display destination, and the control unit 111 outputs an image 151 generated at the image generation unit 112 to the drawing lights 117 based on the information to be displayed (S105, S106). Conversely, if it is determined that drawing cannot be performed, the display destination selection unit 113 selects the display 116 as the display destination, and the control section 111 displays the image 151 on the display 116 (S107).

On the other hand, if the obtained information includes information related to security or privacy (S103: Yes), the process goes into security mode. First, the display destination selection unit 113 shows guidance 152 concerning a projection object 115, such as "Please hold out your hand," on the display (S108). If the display destination selection unit 113 detects the projection object 115 based on the measurement results of the sensor 121 (S109: Yes), the specified projection object 115 is selected as the display destination, and the control unit 111 outputs the image 151 to the drawing lights 117 (S110, S111). If no projection object 115 is detected (S109: No), the image 151 is shown on the display 116 in security mode (S112).

According to the foregoing configuration of the vehicle information display system 101, as a display destination is selected based on a plurality of conditions, including the content of the information to be displayed to the user U and the environment on which the information is to be displayed, the system provides the effect of allowing the information to be displayed in a more suitable environment while giving consideration to the privacy and security of the user U.

Embodiment 2

Figure 9:
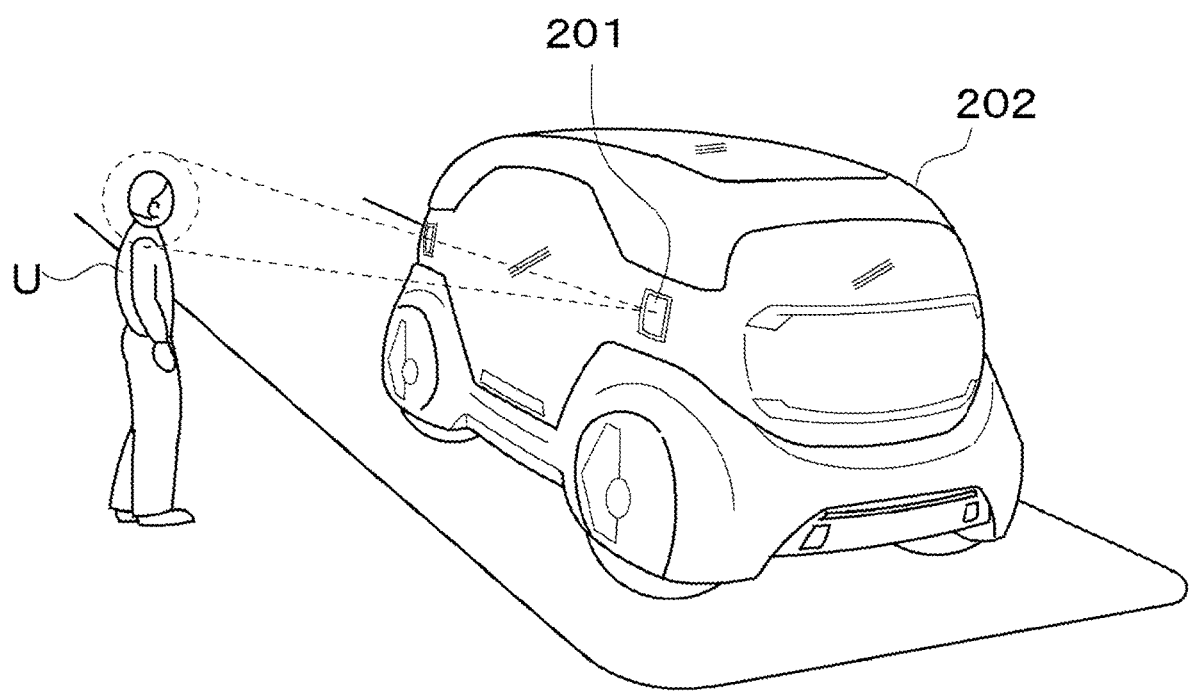
FIG. 9 is a schematic view showing a vehicle that has installed thereon a vehicle information display device of Embodiment 2.
Figure 10:
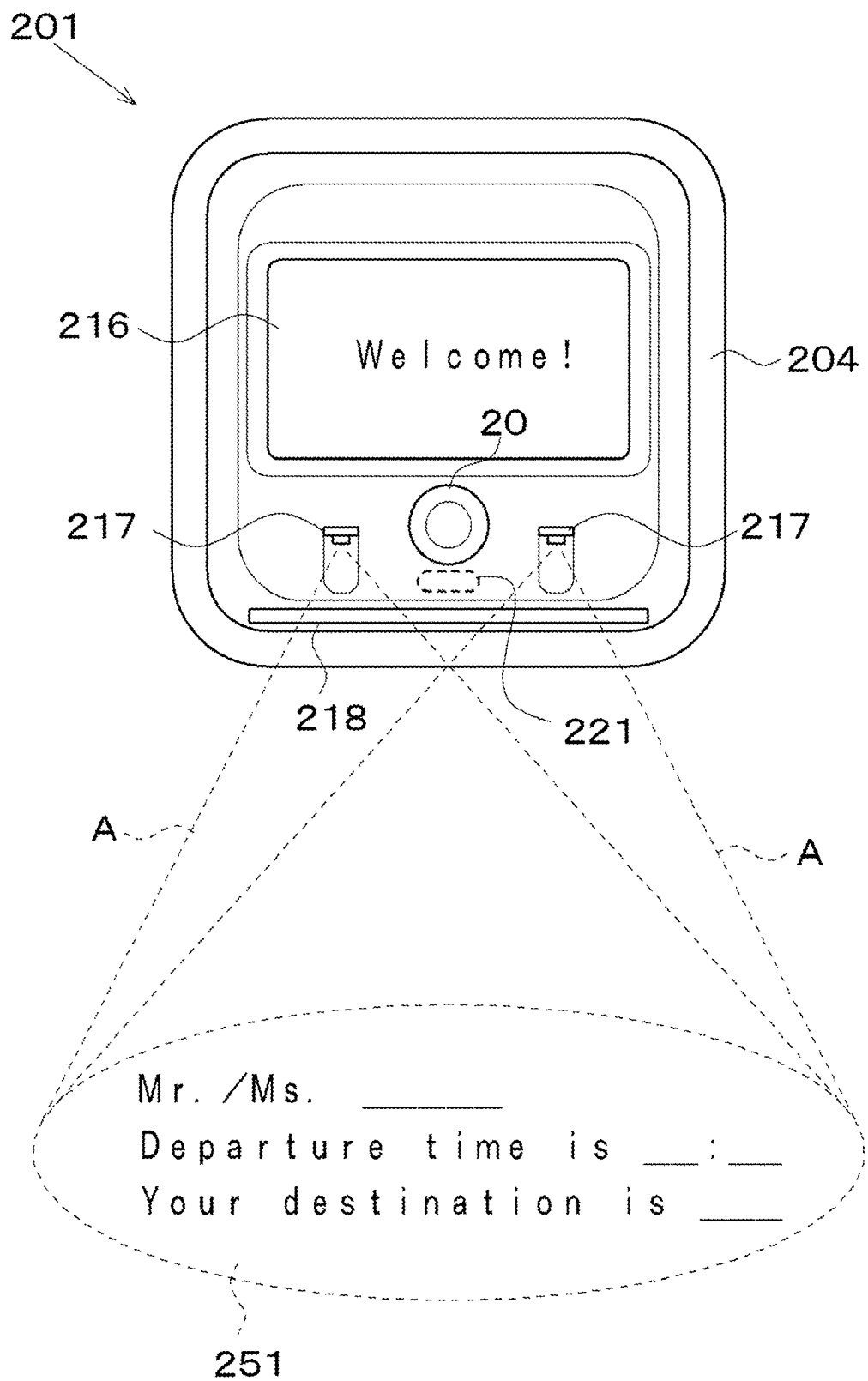
FIG. 10 is a schematic diagram of the vehicle information display device of Embodiment 2.

As shown in FIGS. 9 and 10, a vehicle information display device 201, upon recognizing a user U who is to use the share car 2, displays "Welcome!" and other hospitality information on a display 216, and outputs from the drawing lights 217 an image 251 including usage information, such as a destination and a usage schedule. In addition, an AD marker (autonomous driving marker) 4 for indicating an autonomous driving state is provided on the periphery of a vehicle information display device 3. The vehicle information display device 201 is capable of receiving advertisements, news items, etc., from an external server 224 and successively displaying them on the display 216 while the vehicle is running with the user U aboard.

Figure 11:
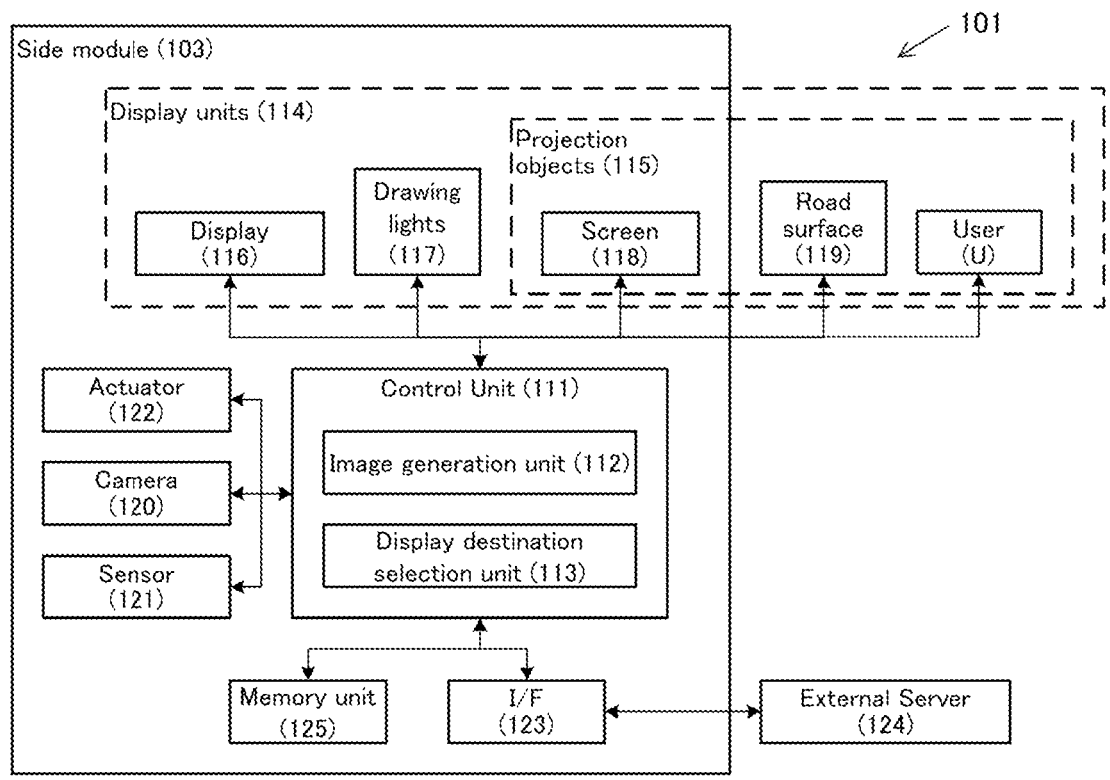
FIG. 11 is a block diagram of the vehicle information display device of FIG. 9.

As shown in FIGS. 9-11, the vehicle information display device 201 is provided with the display 216 for displaying predetermined information to the user U, the drawing lights 217, a screen 218, a camera 220 for detecting the user U, who is to use the share car 2, a sensor 221 for measuring the environment on which the display unit 214 displays information, a memory unit 225 for storing information to be presented to the user U, an external server 224 for distributing information to be presented to the user U by cloud communication or wired communication, a control unit 211 for controlling the vehicle information display device 201, an actuator 222 for adjusting the position in which an image is drawn and the output direction of the drawing lights 217, and an interface 223 for receiving information delivered by the external server 224. Then, the sensor 221 also functions as a sensor to detect the user U. It should be noted that a LiDAR, a millimeter wave radar, a voice sensor, etc., can be employed as the sensor 221.

The display units 214 include the display 216, the drawing lights 217 for drawing an image generated by the image generation unit 212, and projection objects 215 on which the drawing lights 217 project the image. The projection objects 215 include the screen 218, a road surface 219, and at least a part of the user U's body, such as the palms of the hands and the lap. The screen 218 is normally stored in the vehicle information display device 201 to be rolled out of the vehicle information display device 201 during projection (see FIG. 14). The drawing lights 217 can be of a single type capable of drawing a fixed image, or a generative type capable of free drawing using a DMD (Digital Micromirror Device) or other devices.

The control unit 211 includes an image generation unit 212 for outputting an image 251 to be displayed from the display 216 or the draw lights 217 based on information input from the memory unit 225 or the external server 224, and a display destination selection unit 213 for selecting a display unit 214 with which to display the information according to the content of the information.

The display destination selection unit 213 performs face recognition of the user U based on an image of the user U photographed by the camera 220 and the usage information about the share car 102 obtained from the external server 124. Then, once the user U is detected, it selects a display destination according to the content of the information to be displayed and the environment on which it is to be displayed.

The display destination selection unit 213, for example, selects either the display 216 or the road surface 219 as the display destination if the content of the information to be displayed does not include information related to security or privacy, such as the hospitality image "Welcome!" In addition, the display destination selection unit 213 determines whether or not the road surface 219 is suitable as a display environment based on the measurement results received from the sensor 221. The road surface 219 may not be suitable as a display environment, for example, if there is a step on the road surface 219 that may distort the drawing, or if the road surface 219 is wet with rain or covered with snow, making it difficult to read the information drawn thereon.

If the display destination selection unit 213 determines that the road surface 219 is suitable as a projection object 215, the unit selects the drawing lights 217 and the road surface 219 as the display destinations. Then, the image generation unit 212 generates an image 251 for display based on the information to be displayed to the user U, and the control unit 211 outputs the image 251 to the drawing lights 217. Conversely, if it is determined that the road surface 219 is not suitable as a projection object 215, the display 216 is selected as the display destination. In this case, the control unit 211 causes the image 251 to be shown on the display 216.

Figure 12:
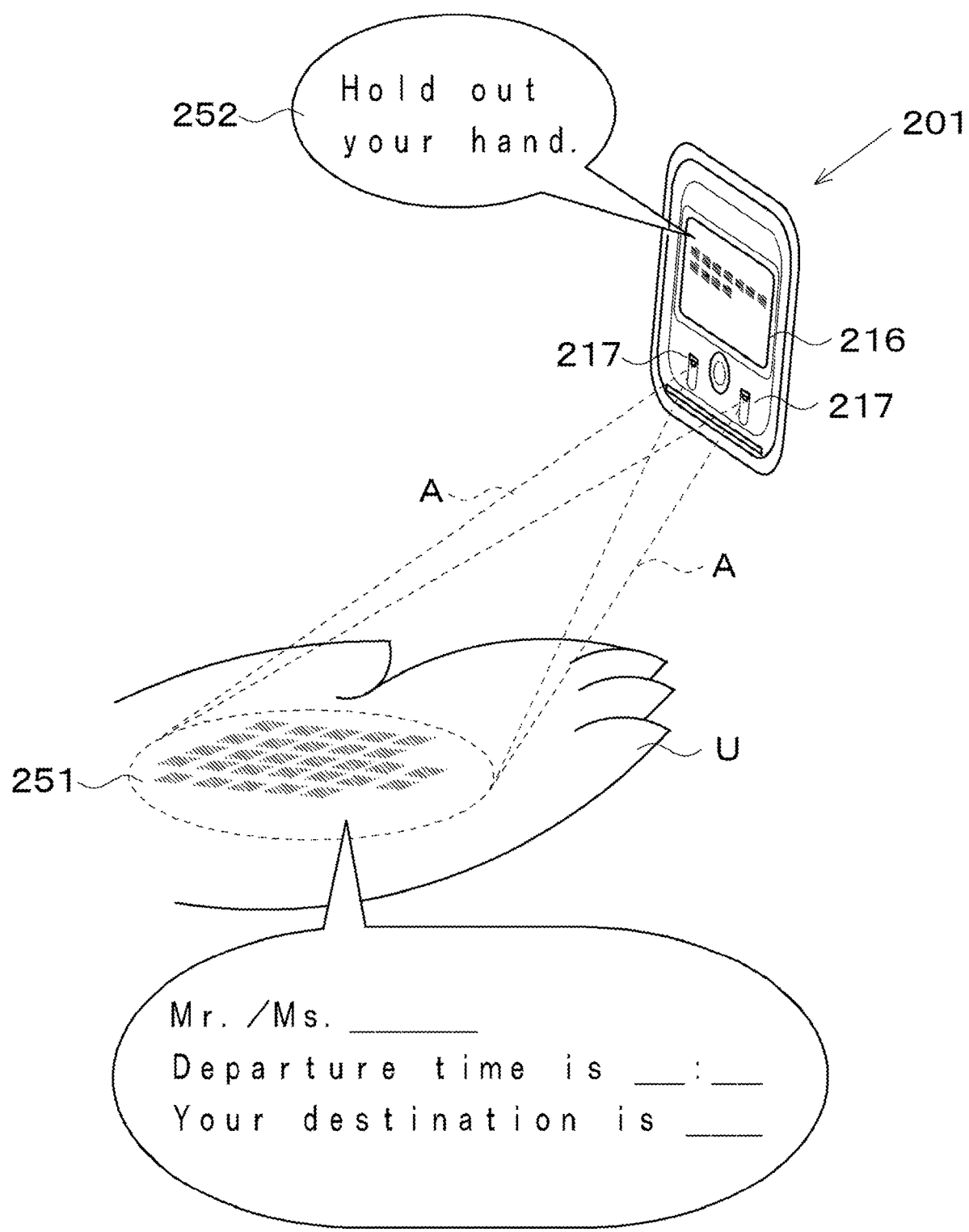
FIG. 12 is an explanatory view that shows how information is projected on the palm of a hand.

If the content of the information to be displayed includes information related to security or privacy, for example, "Mr./Ms. _____," "Your destination is _____," credit card information, information about a financial institution the user has transactions with, the user's address, and family information, the display destination selection unit 213 first shows guidance 252 on the display 216. For example, it may display "Please hold out your hand" as shown in FIG. 12. Then, the display destination selection unit 213 detects whether or not the designated projection object 215, i.e., a palm of the user U, is held out in a position where projection is possible, based on the measurement results received from the sensor 221.

Figure 13:
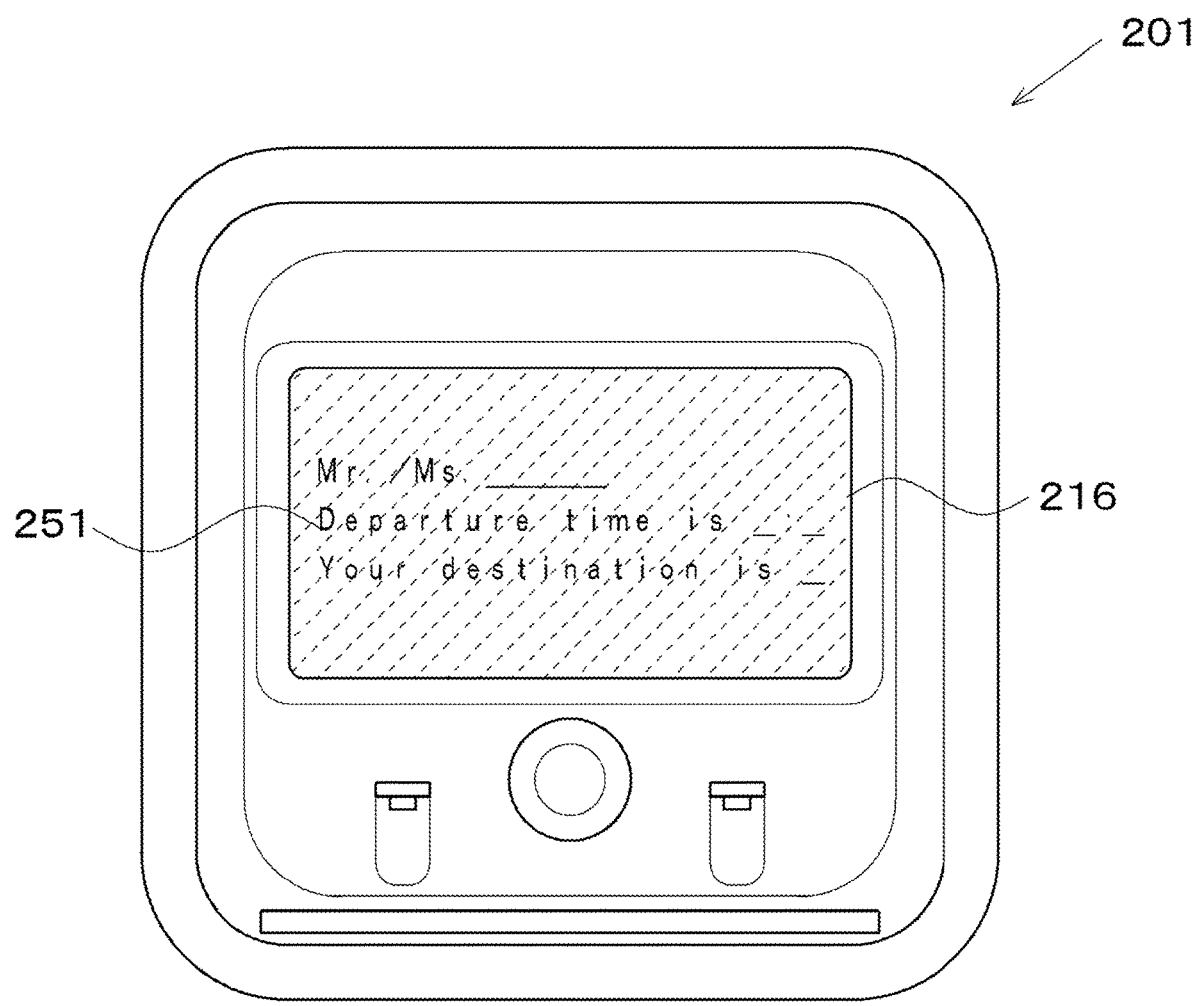
FIG. 13 is an explanatory view that shows how information is projected on a display in a security mode.

If the sensor 221 detects a hand of the user U, which is at least a part of the body of the User U, in the projection range A of the drawing lights 217, the hand of the user U is selected as the display destination, and thereupon the control unit 211 outputs the image 251 to be displayed to the drawing lights 217. Subsequently, the drawling lights 217 start making projection on the hand of the user U. In this case, the user U can confirm the image 251 by looking at his or her palm. On the other hand, if no hand of the user U can be detected, the display destination selection unit 213 selects the display 216 in security mode as the display destination, as shown in FIG. 13. For example, a display 216 configured to allow the image 251 to be visible only from the front of the display 116 can be employed as the display 216 in security mode.

Figure 14:
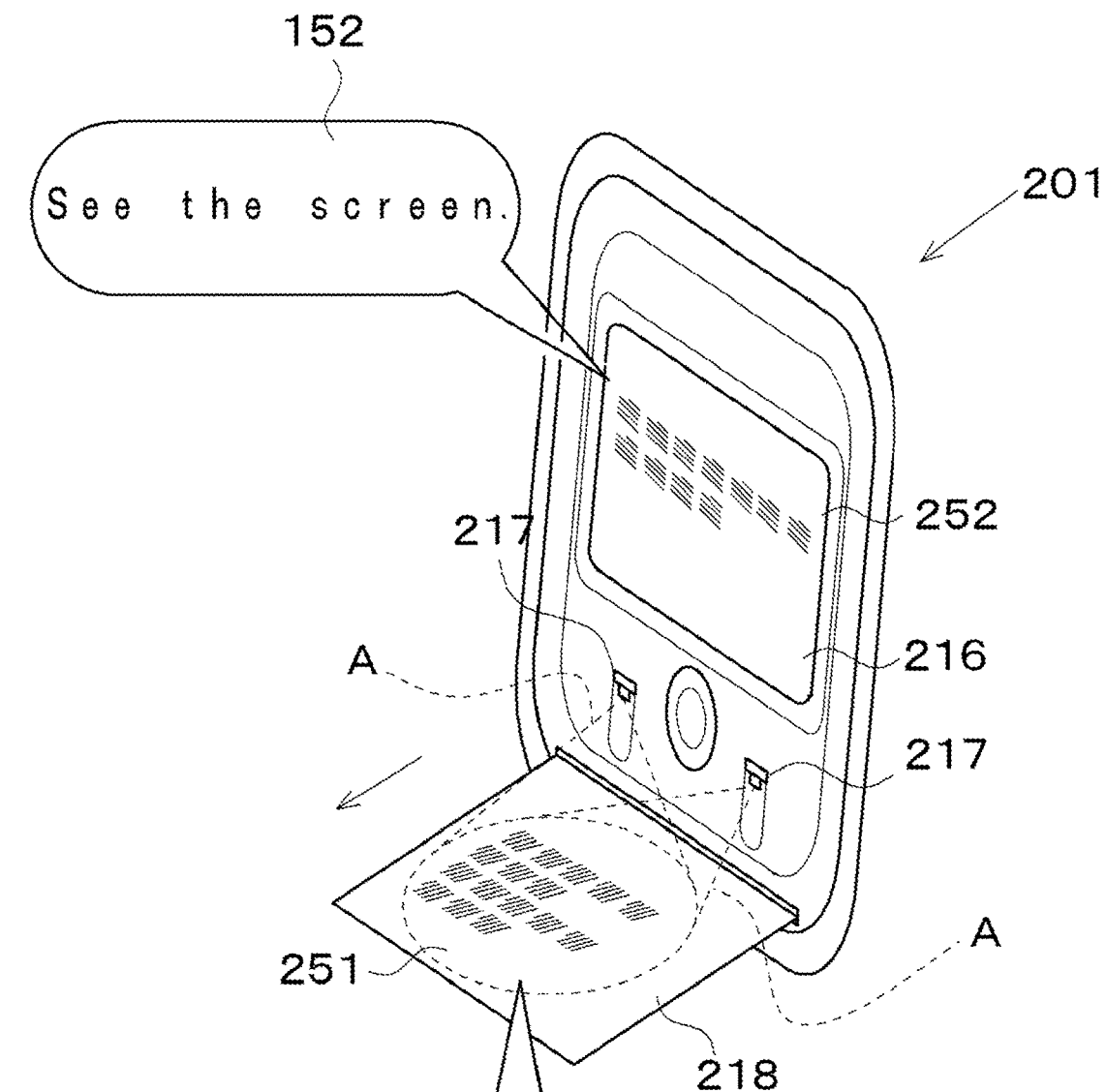
FIG. 14 is an explanatory view that shows how information is projected on a screen.

As shown in FIG. 14, it is also possible to select the screen 218 as the display destination, show "See the screen" on the display 216, and then roll out from the vehicle information display device 201 the screen 218 on which the image 251 is projected.

Figure 15:
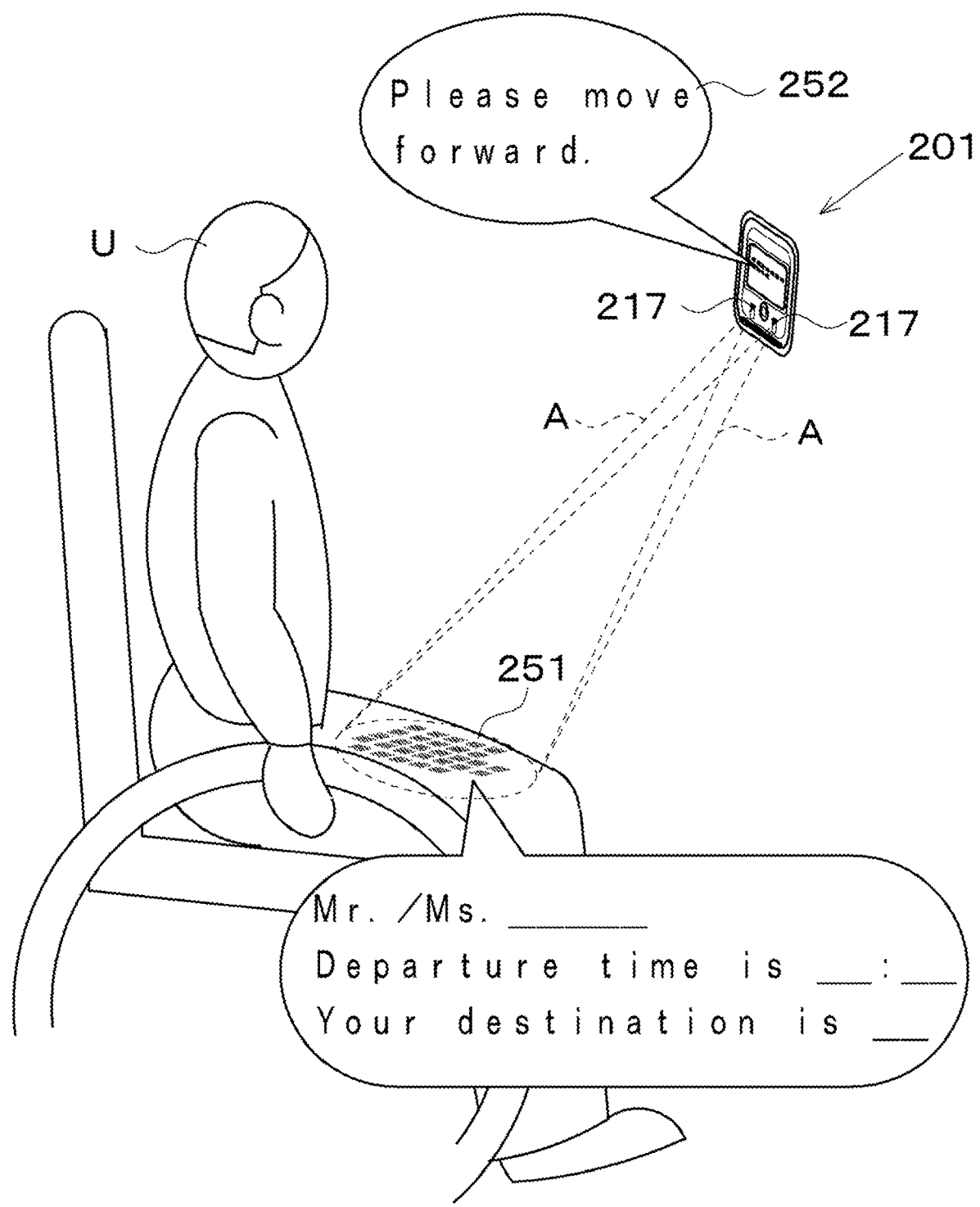
FIG. 15 is an explanatory view that shows how information is projected on a lap.

It should be noted that, for some users U, it may be difficult to hold out their hands or check the screen 218. As shown in FIG. 15, for example, if it is found that the user U is in a wheelchair based on the information obtained from the external server 224, guidance 252, such as "Please move forward" or "Projection will be made on your lap," is shown on the display 216. If the lap of the user U, which is at least a part of the body of the User U, is detected in the projection range A of the drawing lights 217, the display destination selection unit 213 selects the lap of the user U as the display destination, and thereupon the control unit 211 outputs the image 251 to the drawing lights 217. Subsequently, the drawing lights 217 start projection. In this way, the guidance 252 can be displayed according to the state of the user U, and a part of the body of the user U can be selected as required for use as the projection object 215.

Figure 16:
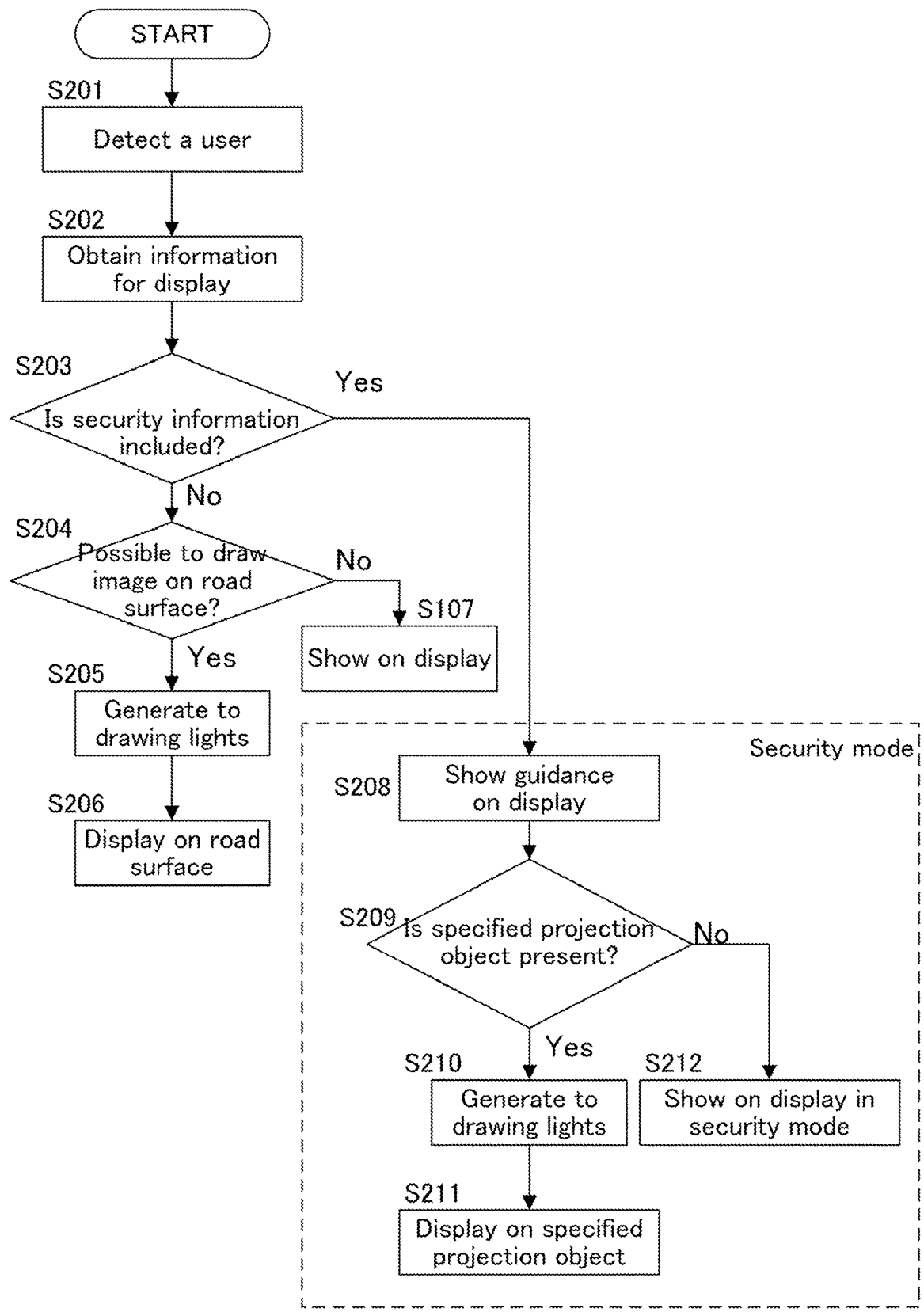
FIG. 16 is a flowchart that indicates the operation to select a display destination performed when the vehicle information display device of FIG. 9 performs display.

Next, the operation of the vehicle information display device 201 will be described with reference to FIG. 16. First, the display destination selection unit 213 detects the user U based on the image received from the camera 220 (S201) and obtains information to be displayed to the user U (S202). If the obtained information does not include information related to security or privacy (S203: No), it is determined whether or not it is possible to draw an image on the road surface 219 based on the measurement results received from the sensor 221. If it is determined that it is possible (S204: Yes), the display destination selection unit 213 selects the road surface 219 as the display destination, and the control unit 211 outputs the image 251 generated by the image generation unit 212 to the drawing lights 217 based on the information to be displayed (S205, S206). Conversely, if it is determined that drawing cannot be performed, the display destination selection unit 213 selects the display 216 as the display destination, and the control section 211 displays the image 251 on the display 216 (S207).

On the other hand, if the obtained information includes information related to security or privacy (S203: Yes), the process enters the security mode. First, the display destination selection unit 213 shows guidance 252 concerning the projection object 215, such as "Please hold out your hand," on the display (S208). If the display destination selection unit 213 detects the projection object 215 based on the measurement results of the sensor 221 (S209: Yes), the specified projection object 215 is selected as the display destination, and the control unit 211 outputs the image 251 to the drawing lights 217 (S210, S211). If no projection object 215 is detected (S209: No), the image 251 is shown on the display 116 in security mode (S212).

According to the vehicle information display device 201 with the above configuration, the drawing lights 217 are configured to start projecting if the sensor 221 detects at least a part of the user's body as the projection object 215 within the projection range A of the drawing lights 217. Therefore, the user U can check the information while concealing it from the eyes of others with his/her own body. This provides an effect of displaying information about user U's privacy and security in a way that is difficult for others to see.

Embodiment 3

Figure 17:
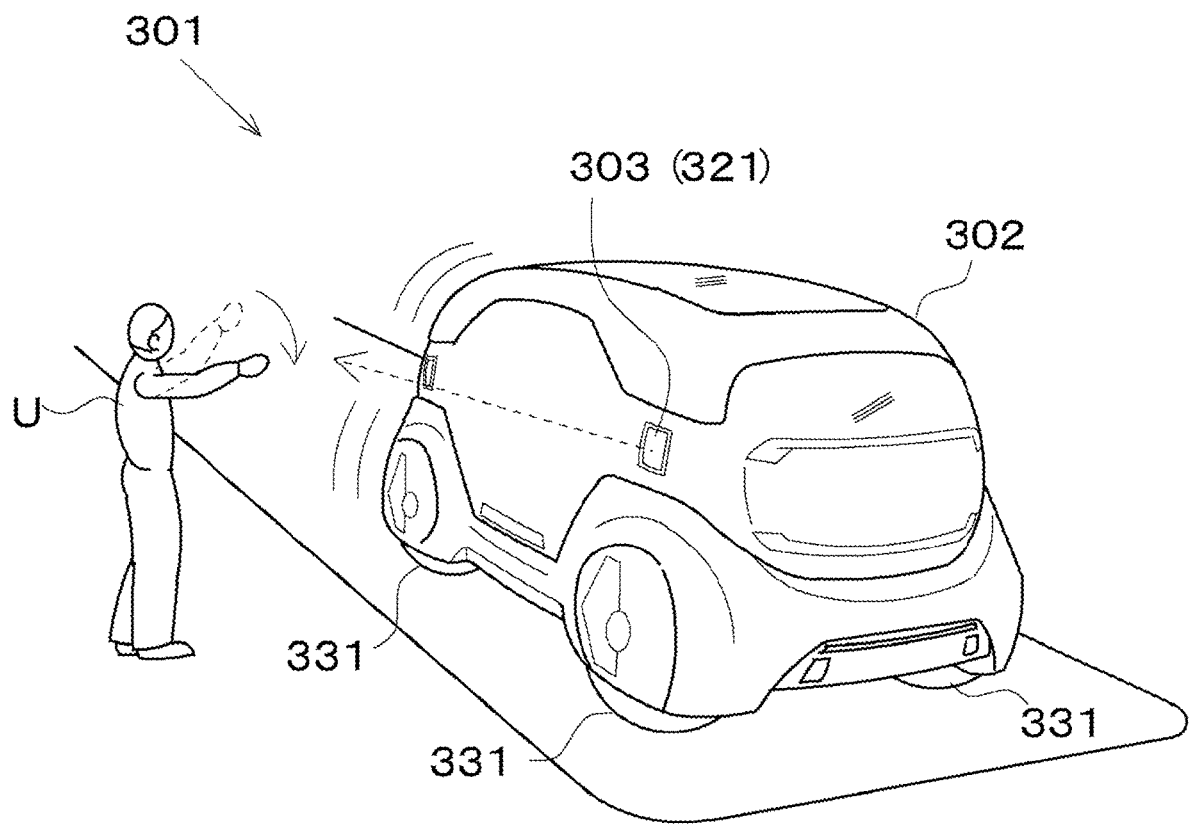
FIG. 17 is a schematic diagram of a vehicle control system according to one embodiment of the present invention.
Figure 18:
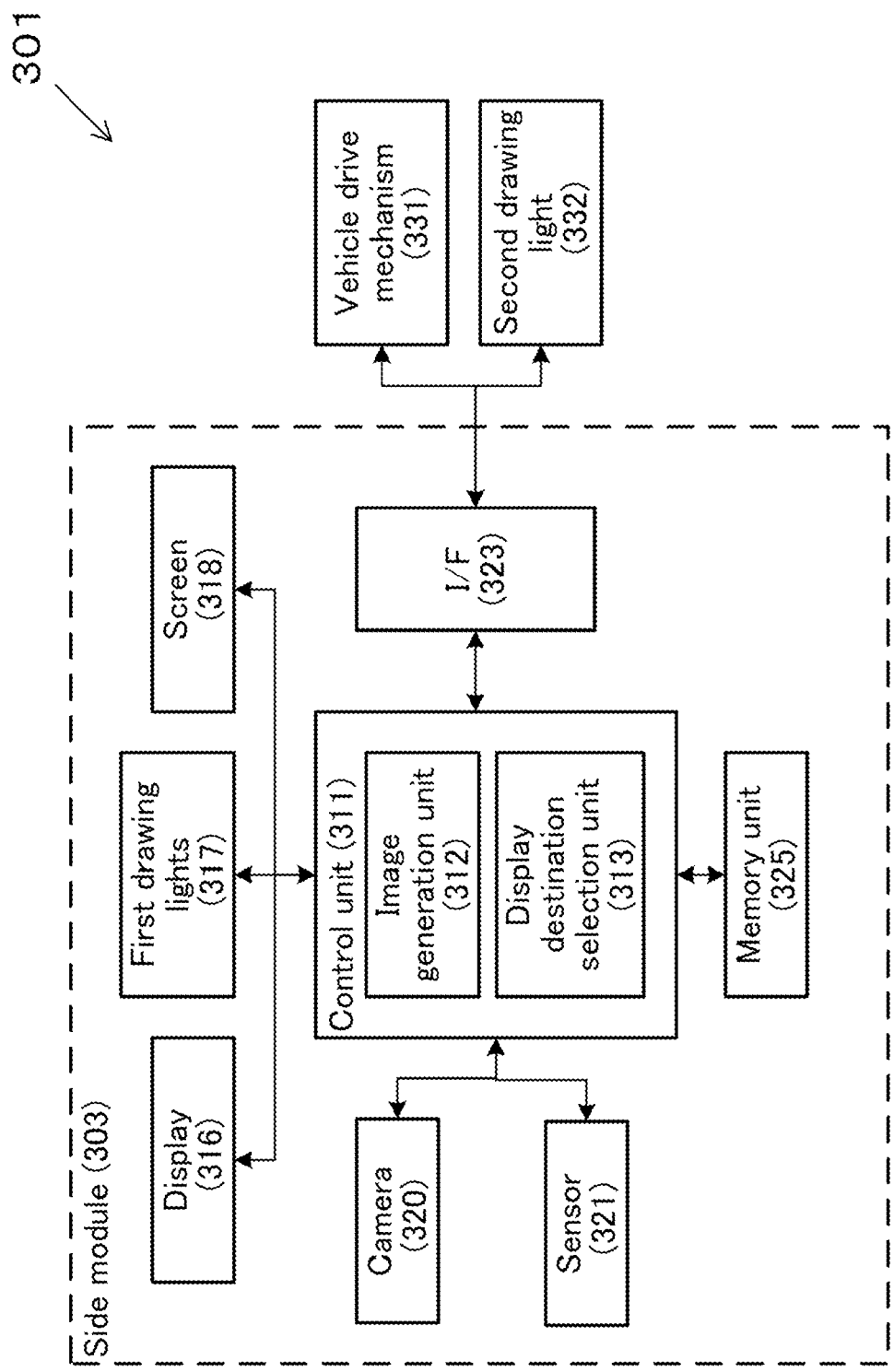
FIG. 18 is a block diagram of the vehicle control system of FIG. 17.
Figure 19:
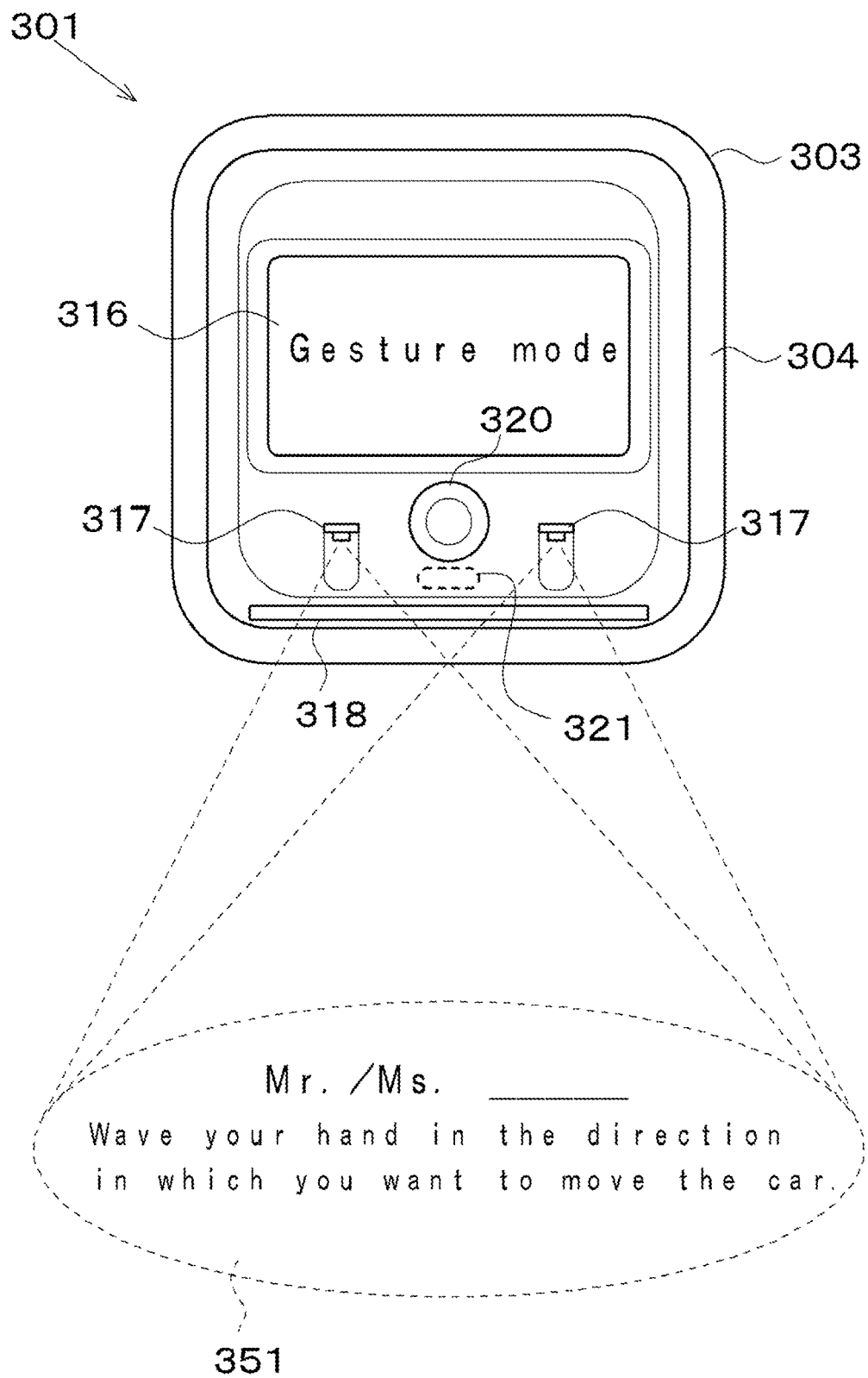
FIG. 19 is a schematic view of a side module.

As shown in FIGS. 17-19, a vehicle control system 301 includes a side module 303 that includes a sensor 321 mounted on an autonomous vehicle 302, a control unit 311 for controlling the vehicle 302 based on the input from the sensor 321, a vehicle drive mechanism 331 for driving the vehicle 302 based on a control signal that is input from the control unit 311, and a second drawing light 32 (see FIG. 22) for projecting on the road surface an image 352 that shows minimum units of movement. The vehicle drive mechanism 331 also includes a mechanism, such as driving wheels, for moving the vehicle 302. As used herein, a minimum unit of movement represents a minute movement distance d (see FIG. 22) by which to move the vehicle 302 due to the minute activation of the vehicle drive mechanism 331 according to a signal pulse in a control signal generated by the control unit 311.

The side module 303 includes display units, such as a display 316 for displaying predetermined information to a user U, first drawing lights 317, and a screen 318, a camera 320 for performing face recognition of the user U in the vicinity of the vehicle, the sensor 321 for detecting a gesture and voice of the user U, a memory unit 325 for storing information to be outputted to the display 316 and/or the first and second drawing lights 17 and 32, and an interface 323 for transmitting control signals from the control unit 311 to the vehicle drive mechanism 331 and the second drawing light 332. The interface 323 also includes functionality for receiving information delivered by an external server (not shown).

As shown in FIG. 19, an AD marker (autonomous driving marker) 4 for indicating an autonomous driving state is provided on the periphery of the side module 303. It should be noted that a LiDAR, a millimeter wave radar, a voice sensor, etc., can be employed as the sensor 321, and the sensor 321 can be used to measure the driving environment including the road condition, the brightness around the vehicle, and the distance between the vehicle and another vehicle. Alternatively, the camera 320 may be used to perform face recognition of the user U so that, if the recognition is successful, the user U's gesture may be input from the sensor 321.

The control unit 311 includes an image generation unit 312 for generating images 351, 52 to be outputted from the display 316 and the first and second drawing lights 17, 32 based on the information that is input from the memory unit 352 and the external server, and a recognition unit 313 for recognizing the gesture of the user U detected by the sensor 321 as an instruction for moving the vehicle. Then, the control unit 311 also performs processing to transmit a control signal to the vehicle drive mechanism 331 based on the recognized instruction.

The image generation unit 312 generates the images 351, 52 to be output to the display 316 and the first and second drawing lights 17 and 32. The image output to the drawing lights 17 can be projected on the screen 318, the road surface around the vehicle, or a part of the user U's body, such as a palm or the lap of the user U. The screen 318 is normally stored in the side module 303 and is rolled out of the side module 303 during projection. The drawing lights 17 can be of a single type capable of drawing a fixed image, or a generative type capable of free drawing using a DMD (Digital Micromirror Device) or other devices. As shown in FIG. 19, it is also possible to show an autonomous driving mode on the display 316 and show guidance on the road surface using the first drawing lights 317.

The recognitions unit 313 processes the user U's action, or performs voice recognition or lip-reading based on lip movement, based on information input by the sensor 321, such as an image, video, and distance, to recognize an instruction for moving the vehicle. The method of recognition may be selected from a pattern matching based on predetermined image/video information or sound information, or AI with deep learning of gesture and voice for moving a vehicle. Examples of gestures include waving of a hand or arm, or pointing with a finger in a desired direction of movement of the vehicle. In addition, the user U's facial expression can also be used as gesture. Examples of voice include "Move forward" and "Back up". An example of lip movement includes shaping the mouth to give a voice instruction such as "Move forward" or "Back up".

The recognition unit 313 also determines the direction and the number of times the vehicle 302 is to be moved based on the recognized instruction for vehicle movement. For example, the direction of the gesture motion may be interpreted to correspond to the movement direction, and the number of repetitions of the motion can be regarded as the number of movements to be made. Alternatively, the direction of movement can be determined based on the result of voice recognition, the result of lip reading, or the positional relationship between the user U and the vehicle 302, and the number of times the voice or the lip movement is repeated can be determined as the number of movements to be made. In this case, if the recognized voiced words are "Move forward, move forward," for example, the number of movements can be set to two. Other methods that use a combination of instructions based on gesture, voice recognition results, and lip reading results to determine the direction and number of movements can also be employed.

The control unit 311 generates a control signal that includes information on the direction of movement and the number of movements as determined by the recognition unit 313. In this case, the number of movements, in particular, is transmitted by the number of pulses in the control signal. For example, if the user U gives only one instruction, one pulse of a control signal is transmitted. Then, the vehicle drive mechanism 331 executes operation corresponding to one pulse, and the vehicle 302 moves a distance d, which is the minimum unit of movement (see FIG. 22).

The second drawing light draws, on the road surface in the vicinity of the vehicle 302, an image 352 that shows distance d, which is the minimum travel unit, so as to assist the user U in pulling up the vehicle. The drawn image 352 may comprise a parallel line drawn at each interval d, as long as distance d can be determined. The second drawing light can maintain the drawing on the road surface in the direction of movement of the vehicle 302 for a predetermined period of time after the user U's instruction is recognized.

Figure 20:
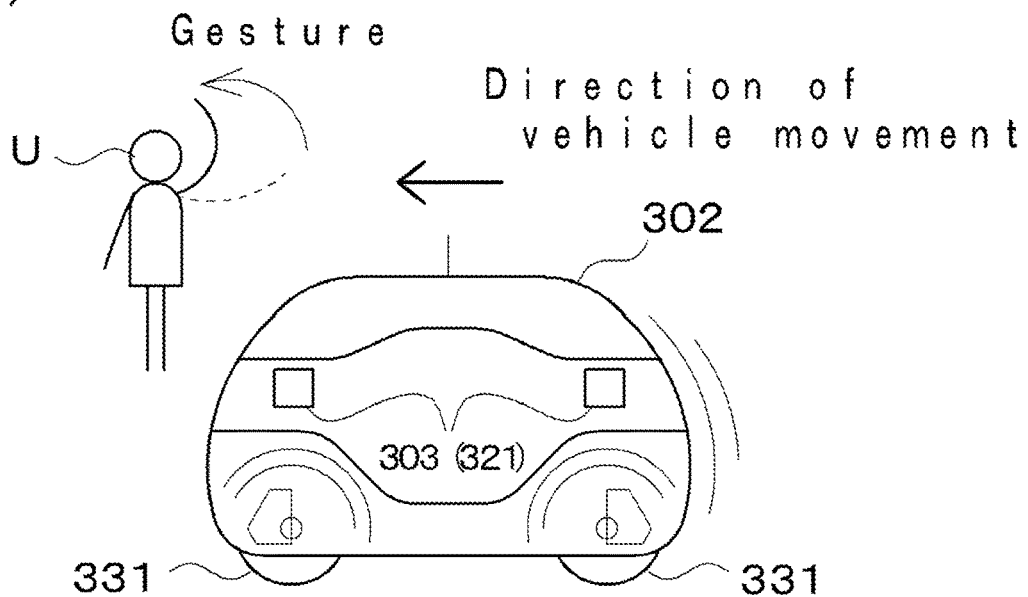
FIG. 20 is an explanatory view that shows how a vehicle is moved via a gesture.
Figure 20:
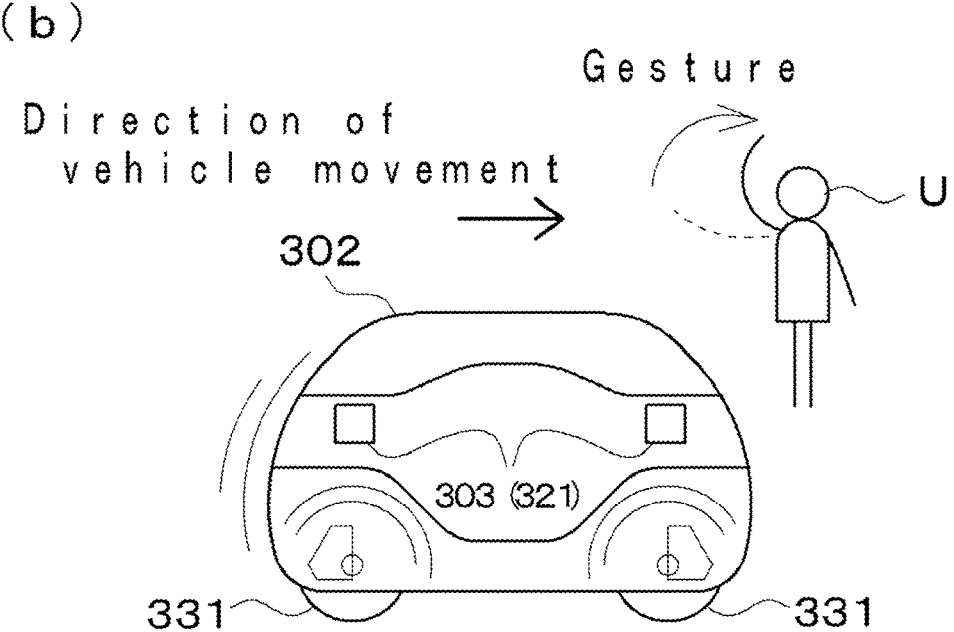
Figure 21:
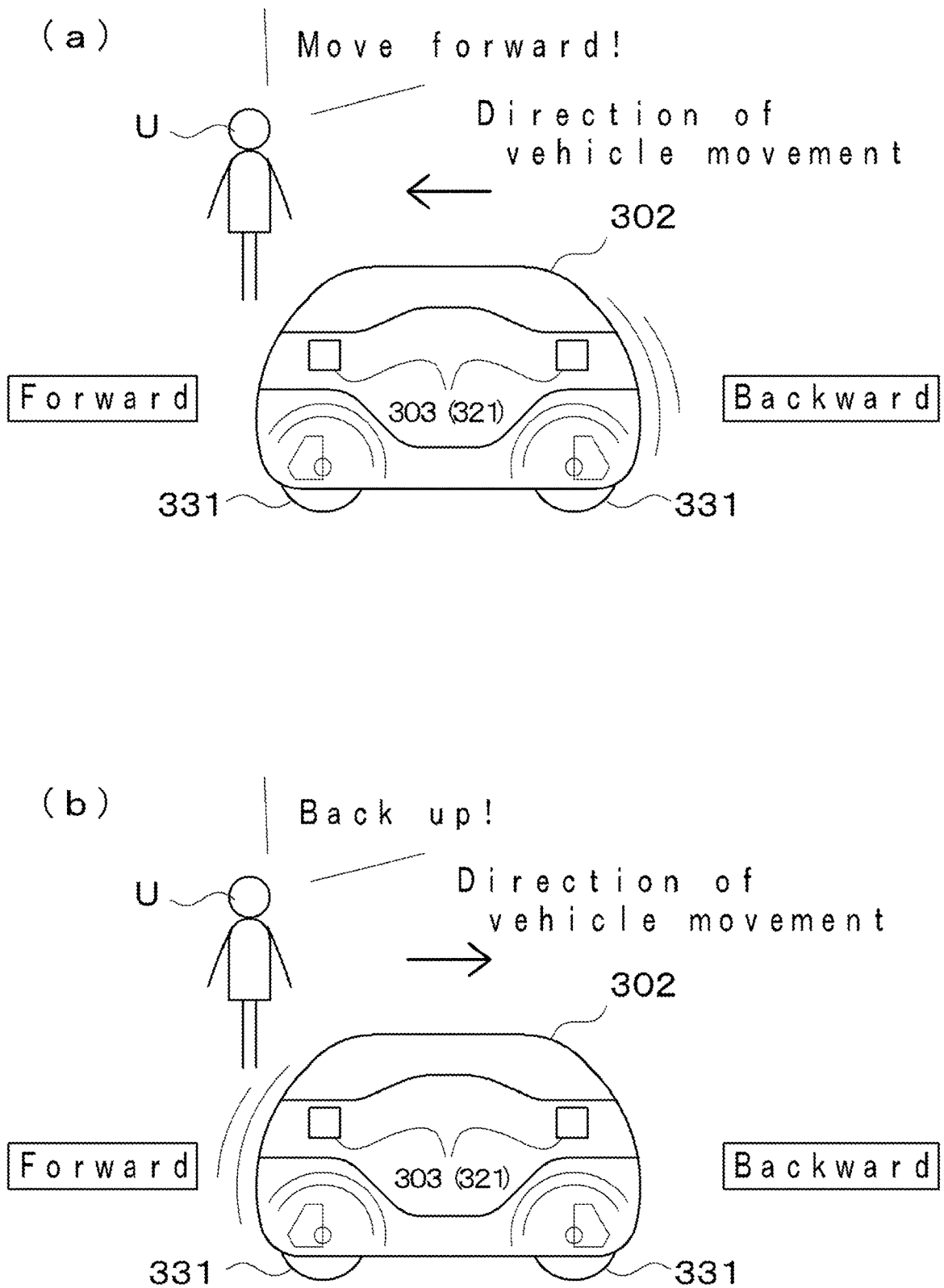
FIG. 21 is an explanatory view that shows how a vehicle is moved via voice.
Figure 22:
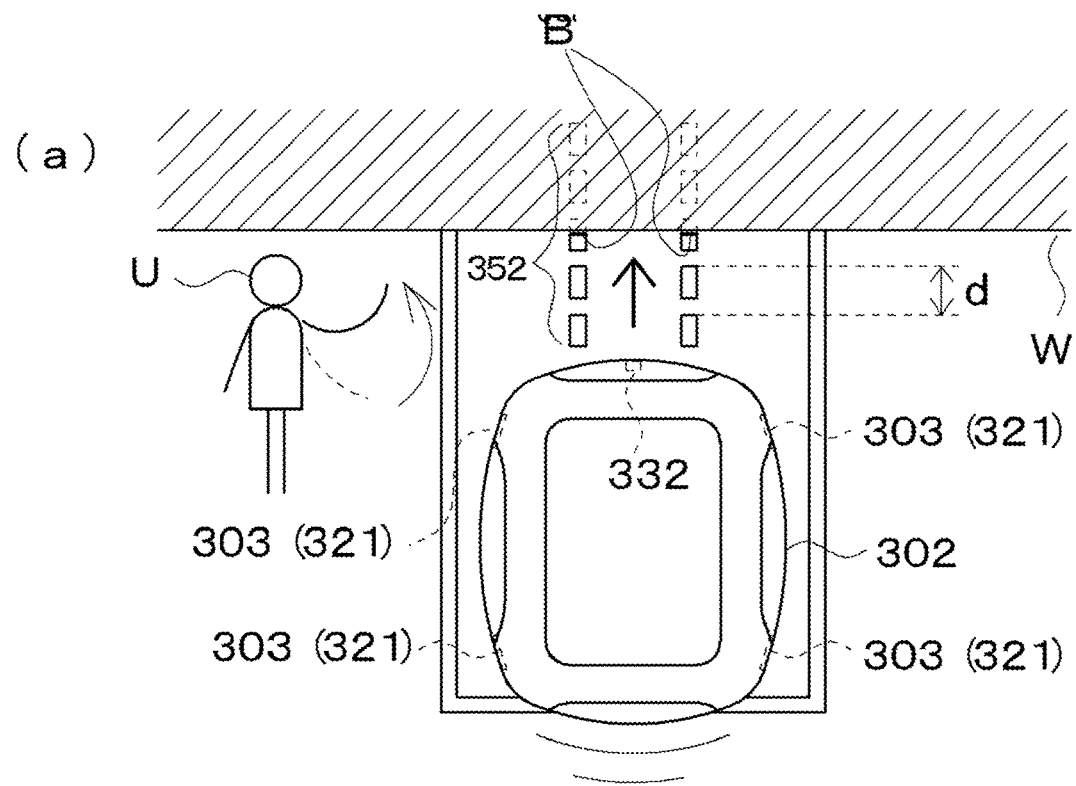
FIG. 22 is an explanatory view that shows how a vehicle is moved while checking minimum units of movement drawn on the road surface.
Figure 22:
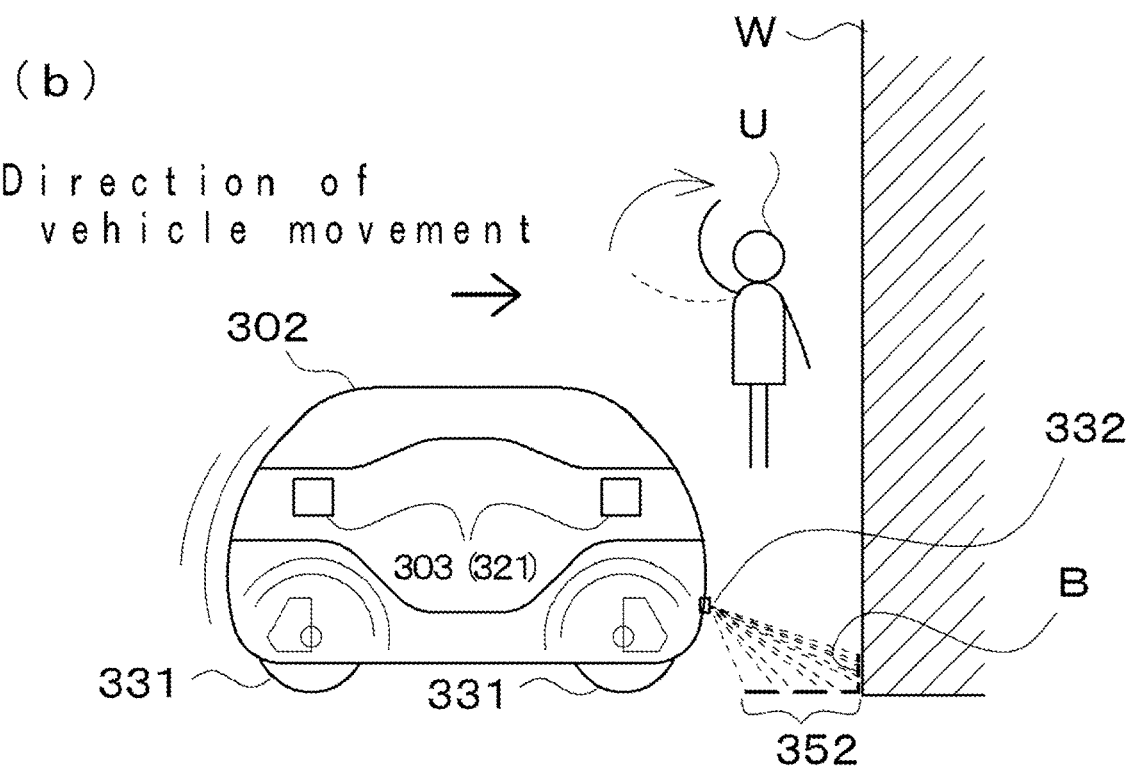

Next, the operation of the vehicle control system 301 will be described with reference to FIGS. 20-22. As shown in FIG. 20, if the user U makes a gesture of waving his/her arm, the sensor 321 detects the gesture, and the recognition unit 313 of the control unit 311 recognizes an instruction for moving the vehicle based on the information input from the sensor 321. Additionally, as shown in FIG. 21, if the user U voices words, such as "Move forward" or "Back up", the sensor 321 detects the voiced words or the changes in the shape of the lips of the user U. and the recognition unit 313 of the control unit 311 recognizes an instruction for moving the vehicle based on the information input from the sensor 321. In this case, the system may be configured to recognize the direction to approach the user U as forward and the direction away from the user U as backward. Instructions for moving the vehicle include the direction of the vehicle's movement and the number of movements, and the control unit 311 generates a control signal based on these instructions and sends it to the vehicle drive mechanism 331. The vehicle drive mechanism 331 is activated for each pulse to move the vehicle 302 by a minimum unit of movement.

The control unit 311 also sends the control signal to the second drawing light 322. As shown in FIG. 22, the second drawing light 332 projects an image 352 showing a distance d, which is the minimum unit of movement, on the road surface in the direction in which the vehicle 302 is to move. If there is an obstacle W, such as a wall, in the direction of travel of the vehicle 302, part of the image 352 will be projected onto the obstacle W. By checking the image 352 projected on the road surface and the obstacle W, the user U can tell the number of times the vehicle can be moved and the movement limit position B of the pulling up of the vehicle.

According to the vehicle control system 301 with the above configuration, since gesture of a user U who is outside of the vehicle is input from the sensor 321 so as to recognize instructions for moving the vehicle at the recognition unit 313, the user U can easily move the vehicle 302 without the need to operate any special device. Moreover, the system provides the effect of allowing for confirmation of the position of the vehicle with the human eye so that a person may pull his/her vehicle up to a desired position. Furthermore, since the number of instructions by gesture and the number of control pulses are matched, the vehicle can be gradually and incrementally pulled up.

The present invention is not limited to the above-described embodiments, and it is also possible to implement the present invention by changing the shape and configuration of each component as appropriate without departing from the spirit of the present invention. For example, it is also possible to install a sensor 321 in front and/or behind the vehicle 302 and configure it to be able to detect gestures, voice, and lip movements of a user U in front of or behind thereof.

LIST OF REFERENCE NUMERALS

101 Vehicle information display system
102 Share car
103 Side module
104 Ad marker
111 Control unit
112 Image generation unit
113 Display destination selection unit
114 Display unit
115 Projection object
116 Display
117 Drawing light
118 Screen
119 Road surface
120 Camera
121 Sensor
122 Actuator
123 Interface
124 External server
125 Memory unit
151 Image
152 Guidance
201 Vehicle information display device
204 Ad marker
211 Control unit
212 Image generation unit
213 Display destination selection unit
214 Display units
215 Projection object
216 Display
217 Drawing light
218 Screen
219 Road surface
220 Camera
221 Sensor
222 Actuator
223 Interface
224 External server
225 Memory unit
251 Image
252 Guidance
301 Vehicle control system
302 Vehicle
303 Side module
304 Ad marker
311 Control unit
312 Image generation unit
313 Recognition unit
316 Display
317 First drawing light
318 Screen
320 Camera
321 Sensor
323 Interface
325 Memory unit
331 Vehicle drive mechanism
332 Second drawing light
351, 352 Images
A Projection range
B Movement limit position
W Obstacle
U User

The invention claimed is:

1. A vehicle information display system for displaying information to a user outside a vehicle for the user to use the vehicle, the system comprising:
  a plurality of displays for displaying the information and
    a control unit for controlling the displays,
    wherein the control unit includes a display destination selection unit for selecting from the displays,
    wherein the plurality of displays include the body of the user,
    wherein the display destination selection unit selects at least one of the plurality of displays according to a content of the information, and wherein if the information includes information related to the security or privacy of the user, the body of the user is selected as the at least one of the plurality of displays.

2. The vehicle information display system of claim 1, further comprising a sensor for measuring an environment on which the information is displayed by the at least one of the plurality of displays,
   wherein the display destination selection unit selects the at least one of the plurality of displays according to a result of measurement by the sensor.

3. The vehicle information display system of claim 1, wherein the plurality of displays includes a first display and a drawing light for outputting the information and projection objects on which the drawing light projects the information.

4. The vehicle information display system of claim 1, wherein the at least one of the plurality of displays of includes a first display and a drawing light for outputting the information and projection objects on which the drawing light projects the information, and
   wherein when selecting at least one of the projection objects, the display destination selection unit displays an instruction concerning the at least one of the projection objects on the first display.

5. A vehicle information display device for displaying information to a user outside a vehicle for the user to use the vehicle, the device comprising:
   a drawing light for projecting the information to an outside of a vehicle and a sensor for detecting the user,
   wherein the drawing light starts projection of the information on the body of the user when the sensor detects at least a part of the body of the user in a projection range of the drawing light.

6. The vehicle information display device of claim 5, further comprising a display capable of outputting the information,
   wherein the drawing light and the display are capable of outputting different information concurrently.

7. The vehicle information display device of claim 5, further comprising a plurality of projection objects on which the information is projected, wherein the information displayed on the display includes a content that instructs the user to position at least one of the plurality of projection objects.

8. The vehicle information display device of claim 7, wherein the at least one of the plurality of projection objects includes a screen.

9. A vehicle control system comprising:
   a sensor mounted on an autonomous vehicle,
   a vehicle drive mechanism for driving the vehicle based on an input from the sensor and a control unit for controlling the vehicle drive unit,
   wherein the sensor detects an arm-waving gesture of a user using the vehicle while outside the vehicle,
   wherein the control unit includes a recognition unit for recognizing the arm-waving gesture as an instruction for moving the vehicle and outputting a control signal in unit pulses for causing the vehicle to move for each arm-waving gesture in a direction of arm-waving,
   wherein the vehicle drive mechanism cause a minimum unit of movement of the vehicle for each unit pulse of the control signal.

10. The vehicle control system of claim 9, further comprising a drawing light for projecting an image on a road surface in the vicinity of the vehicle,
    wherein the drawing light projects on the road surface an imagine that indicates a movement limit position of the vehicle.

11. The vehicle control system of claim 9, wherein the sensor detects a voice of the user outside the vehicle, and
    wherein the control unit recognizes the detected voice as the instruction.

12. The vehicle control system of claim 9, wherein the sensor detects a lip movement of the user outside the vehicle, and
    wherein the control unit recognizes the detected lip movement as the instruction.

* * * * *